United States Patent
Torisaki et al.

(10) Patent No.: US 11,363,045 B2
(45) Date of Patent: Jun. 14, 2022

(54) VEHICLE ANOMALY DETECTION SERVER, VEHICLE ANOMALY DETECTION SYSTEM, AND VEHICLE ANOMALY DETECTION METHOD

(71) Applicant: Panasonic Intellectual Property Corporation of America, Torrance, CA (US)

(72) Inventors: Yuishi Torisaki, Osaka (JP); Tomoyuki Haga, Nara (JP); Takamitsu Sasaki, Osaka (JP); Takeshi Kishikawa, Osaka (JP); Hideki Matsushima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 120 days.

(21) Appl. No.: 16/654,728

(22) Filed: Oct. 16, 2019

(65) Prior Publication Data
US 2020/0053112 A1 Feb. 13, 2020

Related U.S. Application Data

(63) Continuation of application No. PCT/JP2019/000720, filed on Jan. 11, 2019.
(Continued)

(51) Int. Cl.
| | | |
|---|---|---|
| H04L 12/40 | (2006.01) | |
| H04L 67/12 | (2022.01) | |
| H04L 9/40 | (2022.01) | |

(52) U.S. Cl.
CPC .......... *H04L 63/1425* (2013.01); *H04L 12/40* (2013.01); *H04L 67/12* (2013.01); *H04L 2012/40215* (2013.01)

(58) Field of Classification Search
CPC ..... H04L 63/1425; H04L 12/40; H04L 67/12; H04L 2012/40215; H04L 63/1458; H04L 12/40006
See application file for complete search history.

(56) References Cited

U.S. PATENT DOCUMENTS

| | | | | |
|---|---|---|---|---|
| 9,830,396 B2 * | 11/2017 | Bai | ...................... | G06F 16/9537 |
| 10,491,011 B2 * | 11/2019 | Uchida | ............. | H01M 10/0525 |

(Continued)

FOREIGN PATENT DOCUMENTS

| | | |
|---|---|---|
| JP | 2013-250929 | 12/2013 |
| JP | 2014-146868 | 8/2014 |

(Continued)

OTHER PUBLICATIONS

International Search Report (ISR) dated Mar. 26, 2019 in International (PCT) Application No. PCT/JP2019/000720.

*Primary Examiner* — Daniel B Potratz
*Assistant Examiner* — Wansik You
(74) *Attorney, Agent, or Firm* — Wenderoth, Lind & Ponack, L.L.P.

(57) ABSTRACT

A vehicle anomaly detection server includes: a communicator that communicates with a vehicle to receive a log of an in-vehicle network in the vehicle; a processor; and a memory including at least one set of instructions that, when executed by the processor causes the processor to perform operations including: selecting, when information indicating that an anomaly is occurring to a first vehicle among vehicles is obtained by the processor, an anomaly-related vehicle from among the vehicles based on the anomaly, the first vehicle being the vehicle that communicates with the communicator; transmitting, to the anomaly-related vehicle via the communicator, a first request to transmit a log of an in-vehicle network in the anomaly-related vehicle; and determining whether an anomaly is occurring to the (Continued)

anomaly-related vehicle, based on information indicated by the log transmitted from the anomaly-related vehicle and received by the communicator.

10 Claims, 14 Drawing Sheets

Related U.S. Application Data

(60) Provisional application No. 62/620,152, filed on Jan. 22, 2018.

(56) References Cited

U.S. PATENT DOCUMENTS

| | | |
|---|---|---|
| 2015/0358351 A1 | 12/2015 | Otsuka et al. |
| 2016/0124976 A1* | 5/2016 | Bai .................. H04L 67/12 707/748 |
| 2018/0295147 A1* | 10/2018 | Haga ............... H04L 12/40006 |
| 2019/0012908 A1* | 1/2019 | Chun ................... G06V 10/25 |

FOREIGN PATENT DOCUMENTS

| | | | |
|---|---|---|---|
| JP | 2017-111796 | 6/2017 | |
| WO | WO-2017104112 A1 * | 6/2017 | ............ H04L 12/28 |

* cited by examiner

FIG. 7

| CAR TYPE | ECU ID | CAN ID | 861 |
|---|---|---|---|
| A | 001 | 100 | |
| | | 101 | |
| | 002 | 200 | |
| | ⋮ | ⋮ | |
| B | 001 | 110 | |
| | | 111 | |
| | 003 | 301 | |
| | ⋮ | ⋮ | |
| C | 004 | 400 | |
| | 005 | 500 | |
| | ⋮ | ⋮ | |

FIG. 8

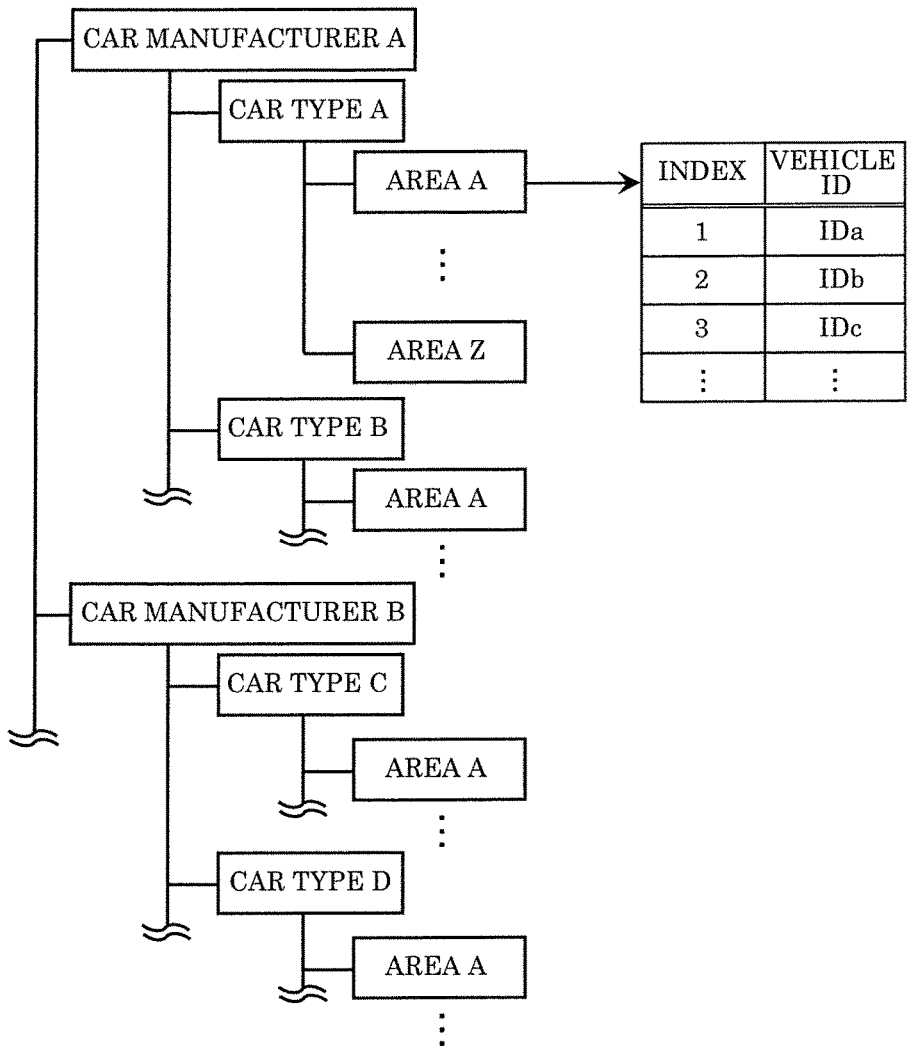

FIG. 9

| CATEGORY OF ATTACK | ATTACK PHASE | OBSERVED ATTACK EVENT | NUMBER OF DETECTIONS | ALERT LEVEL |
|---|---|---|---|---|
| ATTACK SIGN | PHASE 1 | TRIAL-AND-ERROR REPEATED IN ONE VEHICLE | — | 1 |
| | PHASE 2 | ECU OVERWRITING PROCESS | N = 1 | 2 |
| | | | N > 1 | 3 |
| | PHASE 3 | ACQUISITION REQUEST FOR VEHICLE IDENTIFICATION INFORMATION, ACQUISITION REQUEST FOR ECU IDENTIFICATION INFORMATION | N = 1 | 2 |
| | | | N > 1 | 3 |
| ATTACK | PHASE 4 | CONFIRMATION OF UNAUTHORIZED CONTROL | N = 1 | 4 |
| | | | N > 1 | 5 |

FIG. 10

| CAR TYPE A | CAR TYPE B | CAR TYPE C | CAR TYPE D |
|---|---|---|---|
| 001 | 001 | — (NOT INCLUDED) | — (NOT INCLUDED) |
| 002 | 104 | 012 | — (NOT INCLUDED) |
| 003 | — (NOT INCLUDED) | 001 | — (NOT INCLUDED) |
| 004 | 108 | 002 | — (NOT INCLUDED) |
| — (NOT INCLUDED) | — (NOT INCLUDED) | — (NOT INCLUDED) | 306 |
| ⋮ | ⋮ | ⋮ | ⋮ |

FIG. 11

| CAR TYPE A | CAR TYPE B | CAR TYPE C | CAR TYPE D |
|---|---|---|---|
| 000 | 000 | 000 | 000 |
| 001 | 010 | 002 | 005 |
| 002 | 020 | 004 | 010 |
| ⋮ | ⋮ | ⋮ | ⋮ |
| 1023 | — (UNUSED) | 511 | — (UNUSED) |
| ⋮ | ⋮ | ⋮ | ⋮ |

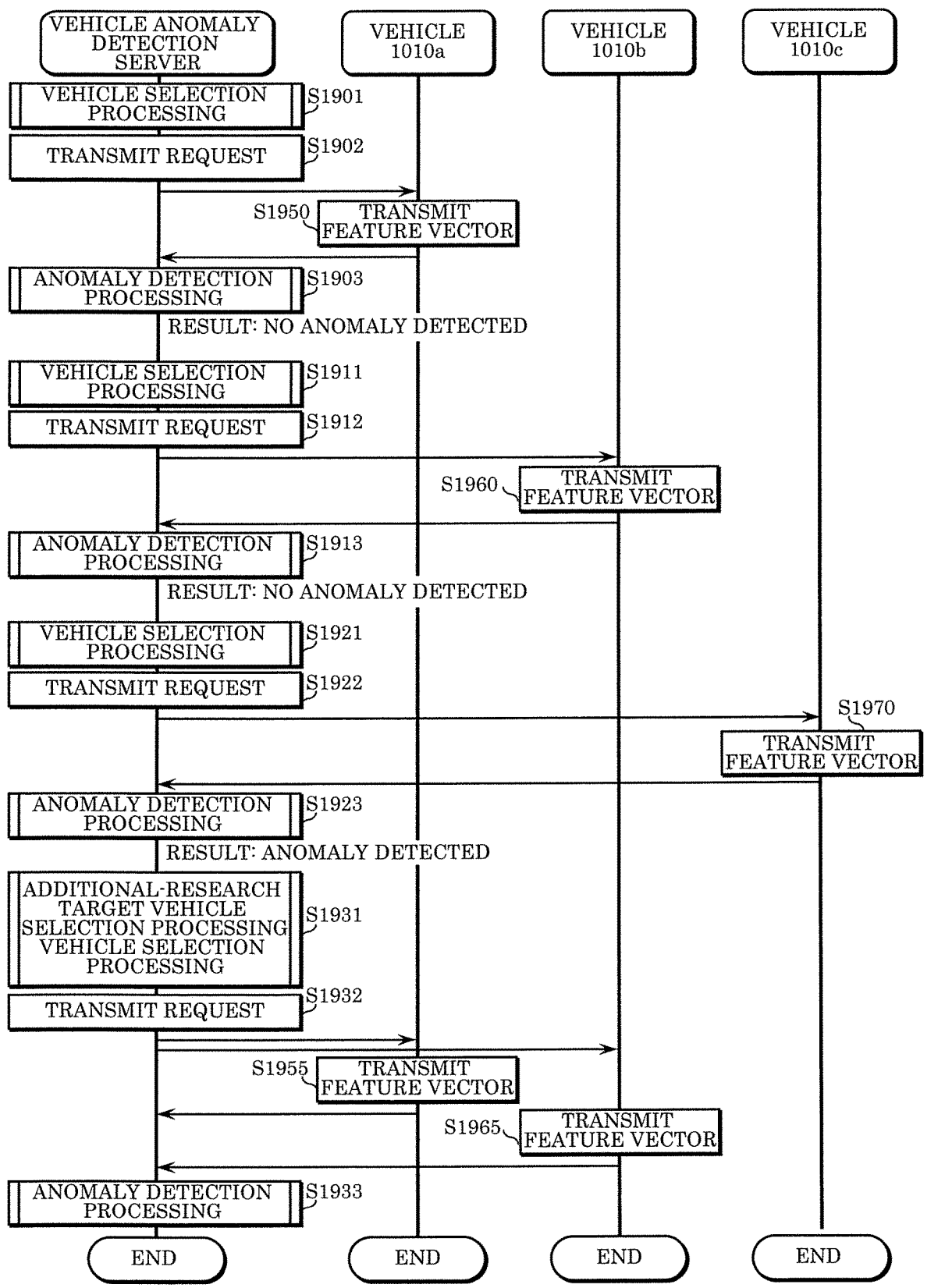

VEHICLE ANOMALY DETECTION SERVER, VEHICLE ANOMALY DETECTION SYSTEM, AND VEHICLE ANOMALY DETECTION METHOD

CROSS REFERENCE TO RELATED APPLICATIONS

This application is a U.S. continuation application of PCT International Patent Application Number PCT/JP2019/000720 filed on Jan. 11, 2019, claiming the benefit of priority of U.S. Provisional Patent Application No. 62/620,152 filed on Jan. 22, 2018, the entire contents of which are hereby incorporated by reference.

BACKGROUND

1. Technical Field

The present disclosure relates to a security technology of detecting and handling an attack frame that can be possibly transmitted over an in-vehicle network on which electronic control units included in a vehicle communicate with each other.

2. Description of the Related Art

Recent automobiles are equipped with multiple devices called "electronic control units (ECUs)". A communication network connecting these ECUs in an automobile is called an "in-vehicle network". Examples of the most leading communication standards used for the in-vehicle networks include a Controller Area Network (CAN) (registered trademark) defined by ISO-11898-1 and Ethernet (registered trademark). As the automobiles grow more sophisticated in their capabilities, ECUs having control functions determined based on data transmitted and received between the ECUs via such an in-vehicle network have been increasingly provided. However, this control system may include an ECU that is fraudulently mounted or taken over by a cyberattack. Such an ECU may possibly transmit a false frame, like a frame having content tampered with, to another ECU to cause this ECU to perform unauthorized control.

With a known technology for detecting and protecting against such an attack, an expected transmission cycle of frames having the same message ID on the in-vehicle network is stored beforehand and whether a frame is fraudulent is determined by a comparison between an actual transmission cycle and this expected transmission cycle (see Japanese Unexamined Patent Application Publication No. 2014-146868).

With another known technology, a frame transmitted and received over the in-vehicle network of a vehicle is transmitted to a server, which then calculates an anomaly level of this frame and appropriately handles various kinds of attacks on the basis of this anomaly level (see Japanese Unexamined Patent Application Publication No. 2017-111796).

SUMMARY

Unfortunately, the above configuration is incapable of immediately performing appropriate handling if an increased number of vehicles transmit data to the server and a bottleneck is caused before the anomaly handling based on the result of processing the data. This may increase the severity of attack damage because, for example, more vehicles may become possible targets of attack.

In view of the above issue, the present disclosure has an object to provide a vehicle anomaly detection device and so forth capable of immediate and appropriate processing for an anomaly, from detection to handling, regardless of the number of monitoring target vehicles.

A vehicle anomaly detection server according to an aspect of the present disclosure includes: a communicator that communicates with a vehicle to receive a log of an in-vehicle network included in the vehicle; a processor; and a memory including at least one set of instructions that, when executed by the processor causes the processor to perform operations including: selecting, when information indicating that an anomaly is occurring to a first vehicle among a plurality of vehicles is obtained by the processor, an anomaly-related vehicle from among the plurality of vehicles based on the anomaly occurring to the first vehicle, the first vehicle being the vehicle that communicates with the communicator; transmitting, to the anomaly-related vehicle via the communicator, a first request to transmit a log of an in-vehicle network included in the anomaly-related vehicle; and determining whether an anomaly is occurring to the anomaly-related vehicle, based on information indicated by the log transmitted from the anomaly-related vehicle in response to the first request and received by the communicator.

Furthermore, a vehicle anomaly detection system according to an aspect of the present disclosure includes: the above-described vehicle anomaly detection server; and a plurality of vehicles that each communicate with the vehicle anomaly detection server and transmit the log to the vehicle anomaly detection server in response to a request from the vehicle anomaly detection server.

Furthermore, a vehicle anomaly detection method according to an aspect of the present disclosure is a vehicle anomaly detection method executed by the above-described vehicle anomaly detection system and includes: when information indicating that an anomaly is occurring to a first vehicle among the plurality of vehicles is obtained by the anomaly detection system, selecting an anomaly-related vehicle from among the plurality of vehicles based on the anomaly occurring to the first vehicle; transmitting a first request from the vehicle anomaly detection system to the anomaly-related vehicle to request the anomaly-related vehicle to transmit a log of an in-vehicle network included in the anomaly-related vehicle; and determining, by the vehicle anomaly detection system, whether an anomaly is occurring to the anomaly-related vehicle, based on information indicated by the log transmitted from the anomaly-related vehicle in response to the first request.

Note that these general or specific aspects may be implemented as an integrated circuit, a computer program, or a computer-readable recording medium, or may be implemented as any combination of an apparatus, a system, a method, a computer program, and a recording medium.

The vehicle anomaly detection device and so forth according to the present disclosure are capable of immediate and appropriate processing for an anomaly, from detection to handling, regardless of the number of monitoring target vehicles.

Further effects and advantages of the present disclosure should be obvious from the description of the present specification and the accompanying drawings. These further effects and advantages may be provided individually by way of embodiments and features disclosed in the present specification and the accompanying drawings. Hence, all the effects and advantages are not necessarily provided here.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 illustrates an exemplary data structure of vehicle information stored in a vehicle information database according to the embodiment;

FIG. 8 illustrates an exemplary data structure of car-type-specific information stored in the vehicle information database according to the embodiment;

FIG. 9 illustrates an exemplary data structure of attack phase information stored in a security information database according to the embodiment;

FIG. 10 illustrates an example of an ECU ID conversion table stored in an ECU information database according to the embodiment;

FIG. 11 illustrates an example of a message ID conversion table stored in the ECU information database according to the embodiment;

FIG. 19 is a sequence diagram illustrating an overview of communications performed by the vehicle anomaly detection system.

DETAILED DESCRIPTION OF THE EMBODIMENT

Figure 1:
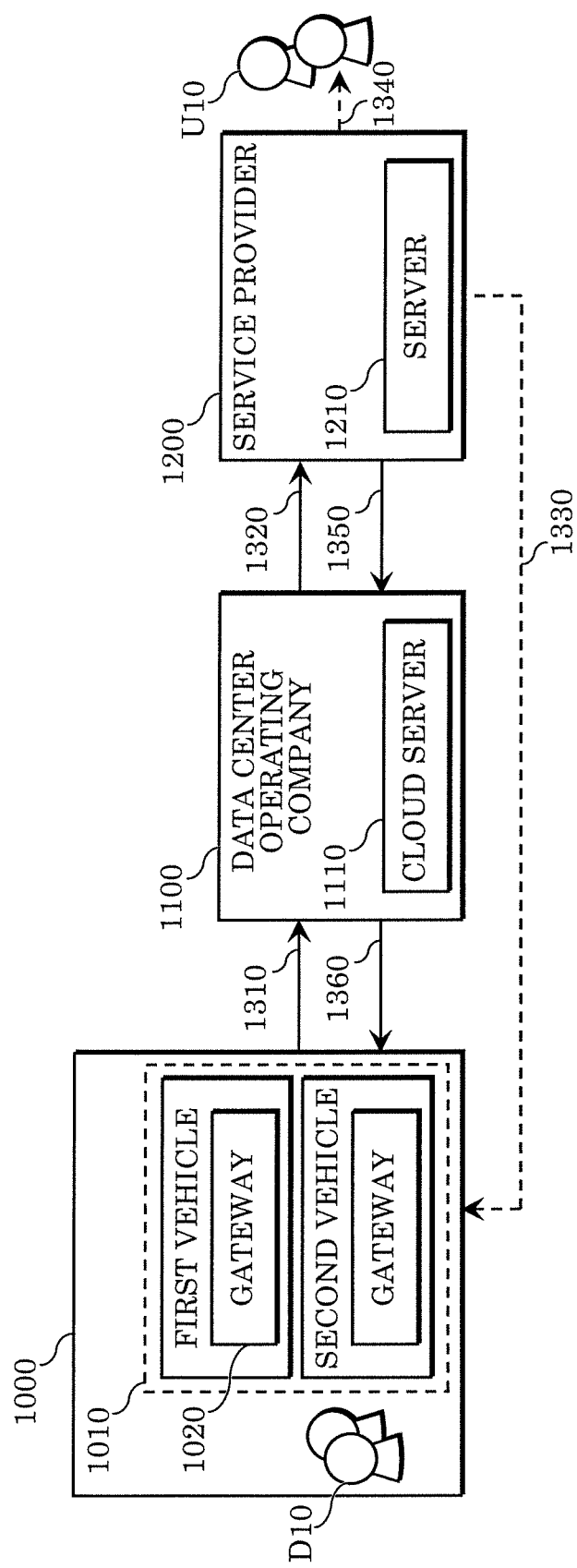
FIG. 1 is a block diagram illustrating an exemplary service structure of a vehicle anomaly detection system according to an embodiment.

Underlying Knowledge Forming the Basis of the Present Disclosure

The inventors found out the following issue regarding the technologies described in the "Description of the Related Art" above.

When a number of vehicles transmit frames transmitted and received over the in-vehicle networks to the server, the amount of communication data traveling over the communication network connecting the vehicles and the server or the amount of data to be processed by the server exceeds the processing capability of the communication network or the server. This can lead to a situation where anomaly detection or appropriate handling of the detected anomaly cannot be executed. To avoid such a situation, a target vehicle for anomaly detection processing performed by the server may be selectively sampled from a vehicle population. Then, the selected vehicle may transmit, to the server, data or a log of this data having transmitted or received over the in-vehicle network of the vehicle. This suppresses an increase in the communication data or an increase in the processing load of the server. However, the server does not perform the anomaly detection processing for a vehicle unselected as a monitoring target. More specifically, an anomaly occurring to the unselected vehicle is not handled, or it takes long before this anomaly is handled. An anomaly due to a cyberattack possibly increases the severity of attack damage while no handling is being performed on this anomaly. For example, this attack may cause serious trouble to the vehicle having this anomaly, or may extend to other vehicles.

In order to solve such a problem, a vehicle anomaly detection server according to an aspect of the present disclosure includes: a communicator that communicates with a vehicle to receive a log of an in-vehicle network included in the vehicle; a vehicle selector that selects, when information indicating that an anomaly is occurring to a first vehicle among a plurality of vehicles is obtained by the vehicle selector, an anomaly-related vehicle from among the plurality of vehicles based on the anomaly occurring to the first vehicle, the first vehicle being the vehicle that communicates with the communicator; a log collector that transmits, to the anomaly-related vehicle via the communicator, a first request to transmit a log of an in-vehicle network included in the anomaly-related vehicle; and a log analyzer that determines whether an anomaly is occurring to the anomaly-related vehicle, based on information indicated by the log transmitted from the anomaly-related vehicle in response to the first request and received by the communicator.

Thus, on the basis of the anomaly detected in one vehicle, anomaly determination is performed, more preferentially than in a conventional case, on another vehicle that is likely to have a similar anomaly. The early detection of anomaly occurrence enables immediate handling. This suppresses an increase in the severity of attack damage to the vehicle or prevents the attack from extending to other vehicles.

For example, the vehicle selector may select a first sample vehicle from among the plurality of vehicles, the log collector my transmit, to the first sample vehicle via the communicator, a second request to transmit a log of an in-vehicle network included in the first sample vehicle, the log analyzer may determine whether an anomaly is occurring to the first sample vehicle, based on information indicated by the log transmitted from the first sample vehicle in response to the second request and received by the communicator, when the log analyzer determines that no anomaly is occurring to the first sample vehicle, the vehicle selector may select a second sample vehicle different from the first sample vehicle from among the plurality of vehicles, and the log collector may transmit, to the second sample vehicle via the communicator, a third request to transmit a log of an in-vehicle network included in the second sample vehicle.

Thus, the determination whether an anomaly is occurring is targeted at some among all the monitoring target vehicles, and the monitoring target vehicle is changed. This suppresses an increase in the communication data and an increase in the amount of data analyzed by the server to detect an anomaly. In addition to this, the efficient monitoring is achieved extensively for the various types of monitoring target vehicles.

For example, the log may be one of: at least a part of time-series data of information included in a frame transmitted and received over the in-vehicle network; and time-series data of information about the frame.

Thus, the determination whether an anomaly is occurring can be made with high accuracy on the basis of, for example, the data content included in the frame or the periodicity of frame transmission.

For example, the vehicle selector may select, as the anomaly-related vehicle, a vehicle that is of same car type as the vehicle having the anomaly.

The vehicles of the same type often include the same type of information processing devices (ECUs). Thus, these vehicles are likely to share the same issue, such as frequently-caused failures, unknown bugs, or vulnerability to cyberattacks. An anomaly detected in a vehicle is more likely to occur similarly to another vehicle of the same type than to another vehicle of different type. These vehicles of the same type are classified as anomaly-related vehicles and treated as targets of data collection used for analysis. This enables efficient anomaly detection and immediate handling of the anomaly.

For example, the vehicle anomaly detection server may further include: a storage that holds first vehicle information indicating an association between a type of a frame transmitted and received over the in-vehicle network and an information processing device that transmits the frame. The vehicle selector may specify, from among the plurality of vehicles, a vehicle including an information processing device that transmits a frame of same type as a frame related to the anomaly occurring to the first vehicle, by reference to the first vehicle information, and select the vehicle specified, as the anomaly-related vehicle.

As described above, the ECUs of the same type are likely to share the same issue. More specifically, when a fraudulent frame is transmitted from an ECU included in one of the vehicles (i.e., when an anomaly is occurring), a similar fraudulent frame is more likely transmitted over the in-vehicle network of another vehicle having the same type of ECU than the in-vehicle network of another vehicle not having the same type of ECU. These vehicles having the ECUs of the same type are classified as anomaly-related vehicles and instructed to transmit the data used for analysis. This enables efficient anomaly detection and immediate handling of the anomaly.

For example, the storage may further hold second vehicle information indicating an association of message IDs between different car types, each of the message IDs indicating a type of a frame transmitted and received over the in-vehicle network, and the vehicle selector may specify, from among the plurality of vehicles, a vehicle including an information processing device that transmits a frame of a type indicated by the message ID specified, by reference to the first vehicle information, and select the vehicle specified, as the anomaly-related vehicle.

A cyberattack is assumed to target a frame of a specific kind, such as a frame including data about acceleration control of the vehicle. However, IDs indicating frame kinds can be set freely, with some exceptions, by system designers of vehicles, and thus are not always the same between the car types. The configuration described above enables efficient anomaly detection and immediate handling of the anomaly occurring to the frame of the same kind as the frame detected to have the anomaly, regardless of the different IDs between the car types.

For example, the vehicle anomaly detection server may further include a storage that holds a vehicle ID list for each car type, the vehicle ID list including a vehicle ID identifying a vehicle as a candidate for a transmission destination of the first request, and the vehicle selector may select the anomaly-related vehicle using the vehicle ID list. Furthermore, for example, the vehicle ID list may indicate a group of vehicle IDs for each geographical area related to the vehicle that is the candidate for the transmission destination of the first request, and the vehicle selector may select the anomaly-related vehicle based on the geographical area indicated by the vehicle ID list.

With this, the vehicle that is more likely to have an anomaly similar to the detected anomaly is instructed to transmit the data for analysis. This enables efficient anomaly detection and immediate handling of the anomaly. Even though the model numbers, each giving an indication of a car type, are the same, the ECUs included in the vehicles may have different specifications depending on manufacturing locations (or manufacturing plants) or places of destination. In contrast, vehicles of different types may include ECUs having the same specifications. Moreover, a vehicle running in a specific region at a specific time may be targeted by a cyberattack. Thus, the anomaly-related vehicle selection based on such a geographical condition is also effective in enhancing the efficiency of anomaly determination.

For example, the vehicle ID list may indicate a group of vehicle IDs for each geographical area related to the vehicle that is the candidate for the transmission destination of the first request, and the vehicle selector may select the anomaly-related vehicle based on the geographical area indicated by the vehicle ID list.

Even an ECU that is not the same type as the ECU transmitting the frame detected to include the anomaly may be susceptible to the adverse effect of the anomaly. For example, an ECU that belongs to the same functional domain as the ECU transmitting the frame detected to include the anomaly or an ECU that receives and processes the frame detected to include the anomaly is more susceptible to the adverse effect of this anomaly than other ECUs. The vehicle including such an ECU is classified as the anomaly-related vehicle and instructed to transmit the data used for analysis. This enables efficient anomaly detection and immediate handling of the anomaly.

Furthermore, a vehicle anomaly detection system according to an aspect of the present disclosure includes: the above-described vehicle anomaly detection server; and a plurality of vehicles that each communicate with the vehicle anomaly detection server and transmit the log to the vehicle anomaly detection server in response to a request from the vehicle anomaly detection server.

Thus, on the basis of the anomaly detected in one vehicle, anomaly determination is performed, more preferentially than in a conventional case, on another vehicle that is likely to have a similar anomaly. The early detection of anomaly occurrence enables immediate handling. This suppresses an increase in the severity of attack damage to the vehicle or prevents the attack from extending to other vehicles.

Furthermore, a vehicle anomaly detection method according to an aspect of the present disclosure is a vehicle anomaly detection method executed by the above-described vehicle anomaly detection system and includes: when information indicating that an anomaly is occurring to a first vehicle among the plurality of vehicles is obtained by the vehicle anomaly detection system, selecting an anomaly-related vehicle from among the plurality of vehicles based on the anomaly occurring to the first vehicle, transmitting a first request from the vehicle anomaly detection system to the anomaly-related vehicle to request the anomaly-related vehicle to transmit a log of an in-vehicle network included in the anomaly-related vehicle, and determining, by the vehicle anomaly detection system, whether an anomaly is occurring to the anomaly-related vehicle, based on information indicated by the log transmitted from the anomaly-related vehicle in response to the first request.

Thus, on the basis of the anomaly detected in one vehicle, anomaly determination is performed, more preferentially than in a conventional case, on another vehicle that is likely to have a similar anomaly. The early detection of anomaly occurrence enables immediate handling. This suppresses an increase in the severity of attack damage to the vehicle or prevents the attack from extending to other vehicles.

Note that these generic or specific aspects may be implemented as an integrated circuit, a computer program, or a computer-readable recording medium such as a CD-ROM, or may be implemented as any combination of an apparatus, a system, a method, an integrated circuit, a computer program, and a recording medium.

Hereinafter, embodiments will be described in detail with reference to the drawings. Note that each of the following embodiments shows a generic or a specific example. The numerical values, shapes, materials, structural components, the arrangement and connection of the structural components, steps, the processing order of the steps, etc. shown in the following embodiments are mere examples, and thus are not intended to limit the present disclosure. Furthermore, among the structural components described in the following embodiments, structural components not recited in any one of the independent claims are described as optional structural components. Moreover, the respective figures are schematic diagrams, and are not necessarily precise illustrations.

EMBODIMENT

1 Overview of Vehicle Anomaly Detection System

An overview of a vehicle anomaly detection system according to the embodiment is first described using an example. FIG. 1 is a block diagram illustrating an exemplary service structure of the vehicle anomaly detection system.

The vehicle anomaly detection system in this example includes: a plurality of vehicles 1010 owned by user (service user) 1000 receiving information security service; cloud server 1110 under the control of data center operating company 1100; and server 1210 under the control of provider 1200 that provides the aforementioned information security service.

A first vehicle and a second vehicle are examples of vehicles 1010 and each include an in-vehicle network. The in-vehicle network includes gateway 1020. Driver D10 actually drives vehicle 1010. A log of data transmitted and received over the in-vehicle network is transmitted from the plurality of vehicles 1010 to cloud server 1110 (as indicated by arrow 1310). A request for transmission of such a log is transmitted from cloud server 1110 to vehicles 1010 (as indicated by arrow 1360). The in-vehicle network of vehicle 1010 is capable of communicating with an external source in this way. The configuration of the in-vehicle network is described in detail later.

Cloud server 1110 is implemented by a plurality of computers, each including: a processor, such as a central processing unit (CPU); storage devices, such as a hard disk drive (HDD), a random access memory (RAM), and a read-only memory (ROM); and a communication interface, such as a network interface controller (NIC). Cloud server 1110 receives logs from the plurality of vehicles 1010 via a communication network, such as the Internet (as indicated by arrow 1310). Cloud server 1110 holds the received logs in such a manner that allows these logs to be provided to server 1210 (as indicated by arrow 1320).

Server 1210 is implemented by one or more computers, each including: a processor, such as a CPU; storage devices, such as an HDD, a RAM, and a ROM; and a communication interface, such as a NIC. Server 1210 analyzes the log obtained from cloud server 1110 to determine whether an anomaly is occurring. A result of this determination is presented to administrative user U10 via server 1210 (as indicated by arrow 1340), for example. Moreover, the result is transmitted to cloud server 1110 (as indicated by arrow 1350) to be stored, and then presented from cloud server 1110 to vehicle 1010 (as indicated by arrow 1360), for example. Administrative user U10 belongs to, for example, service provider 1200. For example, administrative user U10 is in charge of operating this vehicle anomaly detection system and monitoring the status of service provided by the vehicle anomaly detection system. Here, the result of the determination may be directly presented from server 1210 to vehicle 1010 (as indicated by arrow 1330). Vehicle 1010 records the result into a recording medium or presents the result to driver D10 via a user interface, for example. When this result indicates the presence of an anomaly, control operations are performed in accordance with this anomaly. The control operations include disabling a system having the anomaly, withdrawing a function affected by the anomaly, and controlling driving to evacuate vehicle 1010. The control operations may be executed by driver D10, or by an automatic control system if vehicle 1010 is provided with such a system.

Figure 2:
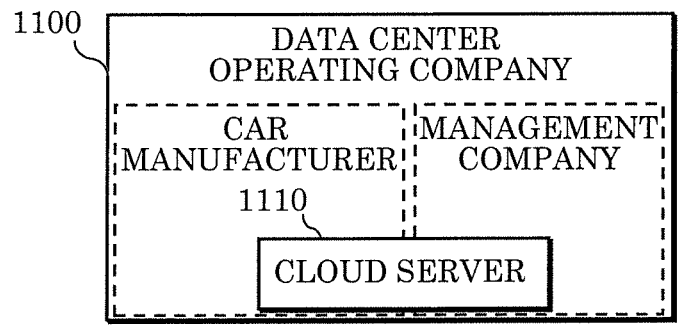
FIG. 2 is a block diagram illustrating an exemplary operating structure of a cloud server included in the vehicle anomaly detection system.

Here, the data center operating company is further described using an example. FIG. 2 is a block diagram illustrating an exemplary operating structure of the vehicle anomaly detection system according to the present embodiment. The data center operating company is established by, for example, a car manufacturer that manufactures vehicles 1010 and a management company that provides and manages facilities enabling continuous collection and storage of data received from vehicles 1010. The data center operating company provides cloud server 1110 to the vehicle anomaly detection system.

The aforementioned service and operating structures are examples. Various changes can be made as long as the embodiment and variations thereof described below are implementable. For example, a request made of vehicle 1010 to transmit a log to cloud server 1110 may be issued by cloud server 1110 in response to an instruction from server 1210 (as indicated by arrows 1350 and 1360). Alternatively, the request may be directly transmitted from server 1210 to vehicles 1010 individually (as indicated by arrow 1330). Moreover, cloud server 1110 may analyze the log to determine whether an anomaly is occurring. In this case, server 1210 may provide only a function of obtaining a result of the determination and presenting the result to a monitoring observer or vehicle 1010. In this example, cloud server 1110 and server 1210 are provided by different entities. However, these servers may be provided by the same entity and implemented by cloud computing that includes one shared computer or more than one computer. For example, the management company illustrated in FIG. 2 and service provider 1200 may belong to the same entity.

A more specific description is as follows. A vehicle anomaly detection server included in the vehicle anomaly detection system according to the present embodiment provides functions of cloud server 1110 or functions of both cloud server 1110 and server 1210 in the above description.

Figure 3:
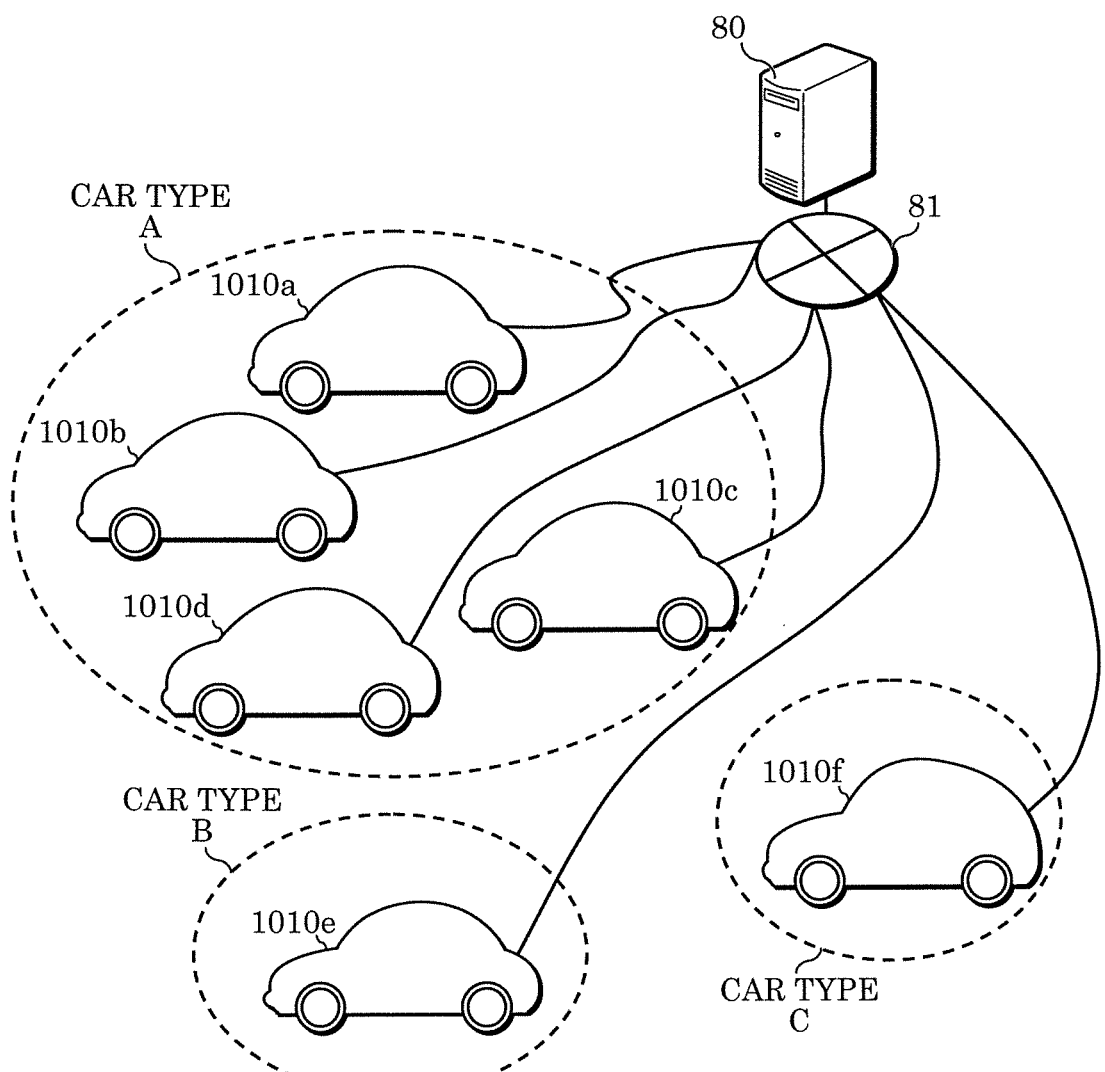
FIG. 3 is a conceptual diagram illustrating an exemplary overall configuration of the vehicle anomaly detection system according to the embodiment.

2 Configuration of Vehicle Anomaly Detection System 2.1 Overall Configuration of Vehicle Anomaly Detection System FIG. 3 illustrates an exemplary overall configuration of the vehicle anomaly detection system according to the present embodiment. In the vehicle anomaly detection system, vehicle anomaly detection server 80 is connected to vehicles 1010a, 1010b, 1010c, 1010d, 1010e, and 1010f via network 81 functioning as a channel.

Network 81 is a communication network usable to implement telematics, such as 3G, 4G, and 5G. Additionally, network 81 may include the Internet and a mobile telephone network, for example.

From a functional perspective, vehicle anomaly detection server 80 corresponds to cloud server 1110 or to both cloud server 1110 and server 1210 illustrated in FIG. 1.

Vehicles 1010a, 1010b, 1010c, 1010d, 1010e, and 1010f correspond to the plurality of vehicles 1010 illustrated in FIG. 1. Hereinafter, these vehicles may be referred collectively to as "vehicle 1010" and at least any one of these vehicles may also be referred to as "vehicle 1010".

Vehicles 1010 include several car types. In this example, vehicles 1010a, 1010b, 1010c, and 1010d belong to car type A. Vehicle 1010e belongs to car type B. Vehicle 1010f belongs to car type C. The vehicles of the same car type refer to, for example, the vehicles that are the same model (vehicle model) and have partially-identical vehicle IDs as identification information of the vehicles. To be more specific, the vehicles of the same car type have the same model value in chassis numbers or the same first digits before serial numbers in vehicle identification numbers (VINs).

Each of vehicles 1010 is provided with an in-vehicle network including: various devices, such as a control device, a sensor, an actuator, and a user interface device; and a plurality of ECUs that are information processing devices connected to these various devices and perform frame-related communications via in-vehicle buses (CAN buses). The ECUs of the in-vehicle network communicate with each other under a CAN protocol. The CAN protocol supports data frames, remote frames, overload frames, and error frames. In the following, data frames are mainly described. Under the CAN protocol, a data frame is defined to include: an ID field storing an ID (hereinafter, also referred to as a message ID) indicating a type appropriate to information represented by the stored data; a data length code (DLC) indicating a data length; and a data field storing the data.

2.2 Configuration of In-Vehicle Network

Figure 4:
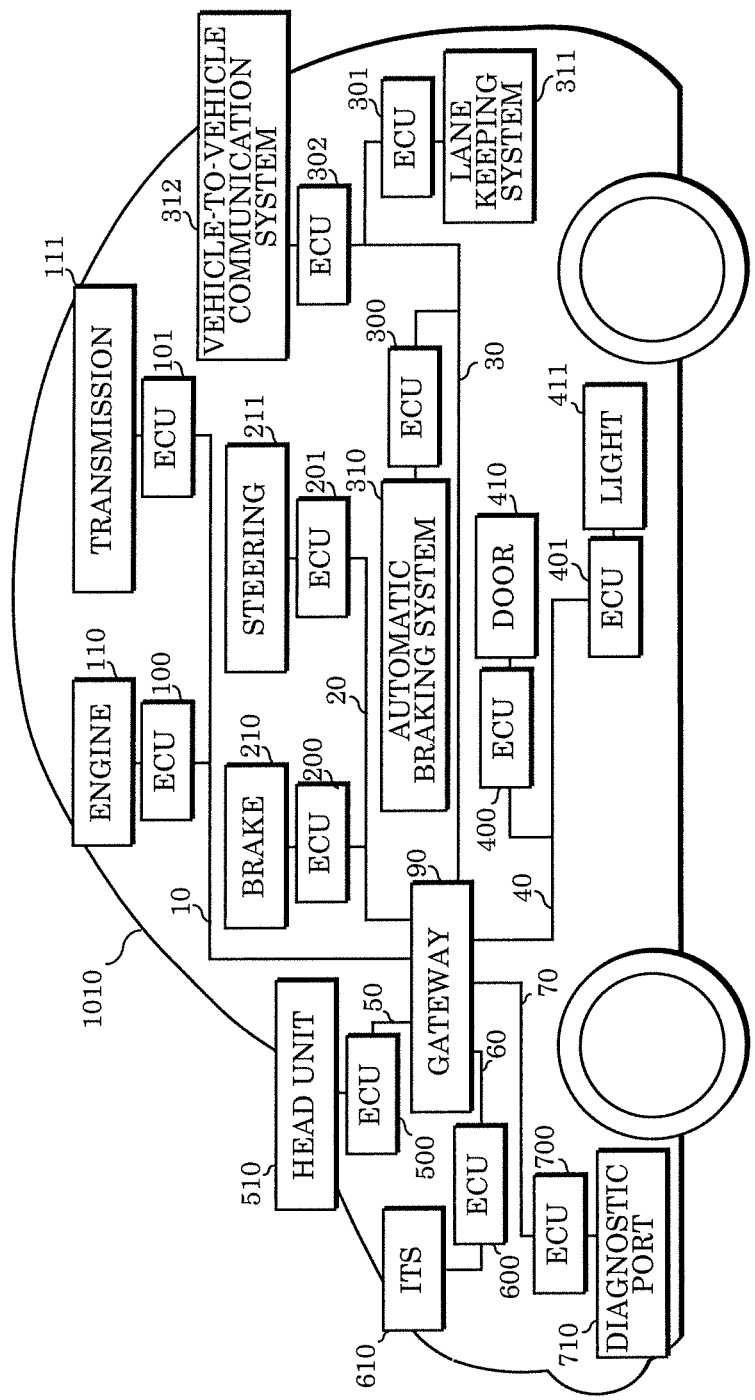
FIG. 4 is a block diagram illustrating an exemplary configuration of an in-vehicle network provided for a vehicle included in the vehicle anomaly detection system.

FIG. 4 illustrates an exemplary configuration of the in-vehicle network provided for vehicle 1010.

The in-vehicle network provided for, for example, vehicle 1010 includes a plurality of nodes, such as a plurality of ECUs (ECUs 100, 101, 200, 201, 300, 301, 302, 400, 401, 500, 600, and 700) and gateway 90, that are connected by buses (CAN buses) 10 to 70. Although not illustrated in FIG. 4, the in-vehicle network may further include multiple ECUs.

The ECU is an example of an information processing device according to the present embodiment, and includes a processor (a microprocessor), a digital circuit like a memory, an analog circuit, and a communication circuit. The memory is a ROM and a RAM, and is capable of storing a control program (a computer program) to be executed by the processor, or storing, in addition to the control program, data referenced when this control program is executed. Data generated in an intermediate or final execution stage of this control program may be held in a writable area of the memory. The processor operates according to the control program, so that the ECU achieves various predetermined functions. The computer program includes a plurality of instruction codes indicating instructions to be given to the processor to achieve a predetermined function.

Bus 10 is connected to powertrain-related ECUs including ECU (engine ECU) 100 and ECU (transmission ECU) 101 connected to engine 110 and transmission 111, respectively. These ECUs relate to "running" (driving or acceleration) of the vehicle, or more specifically, relate to control over a motor, fuel, and a battery.

Bus 20 is connected to chassis-related ECUs including ECU (brake ECU) 200 and ECU (steering ECU) 201 connected to brake 210 and steering 211, respectively. These ECUs relate to control over "turning" (steering) and "stopping" (breaking) of the vehicle.

Bus 30 is connected to safety-function-related ECUs and to an ECU for a vehicle-to-vehicle communication system. These ECUs are ECU 300, ECU 301, and ECU 302 connected to automatic braking system 310, lane keeping system 311, vehicle-to-vehicle communication system 312, respectively. These ECUs relate to an inter-vehicle gap keeping function, a collision avoidance function, and an airbag activation.

Bus 40 is connected to body-related ECUs including ECU 400 and ECU 401 connected to door 410 and light 411, respectively. These ECUs relate to control over vehicle equipment, such as an air conditioner, windows, door mirrors, and a direction indicator.

Bus 50 is connected to infotainment-related ECUs including ECU 500 connected to head unit 510. These ECUs related to an instrument panel, a car navigation system, and audio system, for example. Functions may be shared between the instrument panel and the head unit in any manner.

Bus 60 is connected to ECUs including ECU 60 connected to intelligent transport systems (ITS) device 610. These ECUs respond to an intelligent transport system, such as an electronic toll collection system (ETC).

Bus 70 is connected to ECU 700 connected to diagnostic port 710 that is an interface for communicating with, for example, an external failure diagnostic tool, such as on-board diagnostics 2 (OBD2). Diagnostic port 710 may be connected to bus 70 by bypassing ECU 700.

Note that the devices and systems connected to the ECUs connected to the aforementioned buses are merely examples to describe a concept of the in-vehicle network system. Each of these devices and systems may be replaced with one or more other devices. Moreover, a nonessential device or system may be included among these devices and systems.

Each of the ECUs (such as ECUs 100 and 200) obtains information, such as sensing information or information indicating a state or operation details of a device (such as engine 110 or brake 210) or a system. The ECU periodically transmits a frame (data frame) including data of the obtained information to the in-vehicle network, or more specifically, to the CAN bus.

Gateway 90 is an information processing device that intermediates between a plurality channels (CAN buses) to transfer data between the channels. Gateway 90 is connected to bus 10, bus 20, bus 30, bus 40, bus 50, bus 60, and bus 70. Thus, gateway 90 is one kind of ECU having a function of transferring a frame received from one of the buses to another bus under a certain condition (that is, to a transfer-destination bus selected according to the condition). Gateway 90 includes a communication device (such as a communication circuit) to communicate, via network 81, with vehicle anomaly detection server 80 located outside vehicle 1010. Moreover, gateway 90 has a function of transmitting (uploading) information about the frame received from the bus to vehicle anomaly detection server 80, for example. The configuration of gateway 90 is described in detail later.

Unless otherwise noted, the following is based on the assumption that the vehicles of the same type include the in-vehicle networks having the same configuration. More specifically, the vehicles of types A, B, or C may have the same configuration as in FIG. 4 or may have a configuration partly different from the configuration in FIG. 4. However, these vehicles have the following in common: that the plurality of ECUs connected to the various devices and systems are connected to the CAN buses; that communication between the CAN buses is relayed by the gateway; and the information about the frame transmitted and received over the in-vehicle network is transmitted to the vehicle anomaly detection server located outside the vehicle. The function for communicating with the vehicle anomaly detection server may be provided by, for example, a telematics control unit (TCU) implemented by an ECU different from the gateway. The channels between the ECUs may include a channel constructed under a protocol different from the CAN protocol, such as Ethernet or FlexRay (registered trademark). The following describes an example in which the in-vehicle network is constructed under the CAN protocol.

Unless otherwise noted, the following is based on the assumption that the plurality of vehicles of the same car type share the same use specifications of a data frame (a message) transmitted on the CAN buses of the in-vehicle network. Such specifications include requirements on content of a data field for each message ID indicating a data frame type.

Moreover, vehicles of different types may have the ECUs of the same kind. The ECUs of the same kind have the same configuration and are, for example, the same model made by the same manufacturer (ECU vendor). Additionally, such ECUs have the same configuration for achieving main functions. However, even when the vehicles of the different types have ECUs of the same kind, IDs of frames (message IDs) transmitted by these ECUs of the vehicles may be different.

2.3 Configuration of Vehicle Anomaly Detection Server

Figure 5:
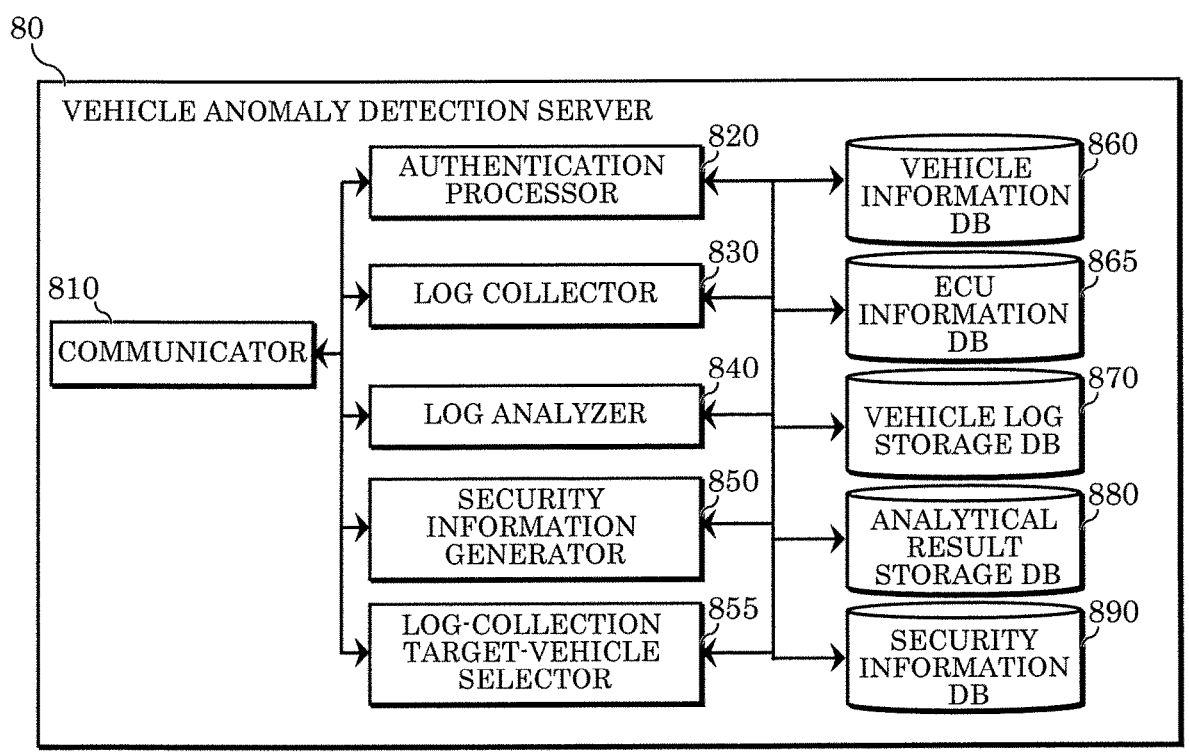
FIG. 5 is a block diagram illustrating an exemplary functional configuration of a vehicle anomaly detection server included in the vehicle anomaly detection system.

FIG. 5 is a block diagram illustrating an exemplary functional configuration of vehicle anomaly detection server 80.

Vehicle anomaly detection server 80, which handles an anomaly occurring to a frame transmitted and received over the in-vehicle network of vehicle 1010, is implemented by cloud server 1110 or by both cloud server 1110 and server 1210 described above. More specifically, vehicle anomaly detection server 80 is implemented by one or more computers each including a processor, a storage device, and a communication interface.

Vehicle anomaly detection server 80 includes communicator 810, authentication processor 820, log collector 830, log analyzer 840, security information generator 850, log-collection target vehicle selector 855, vehicle information database (hereinafter, referred to as "DB") 860, ECU information DB 865, vehicle log storage DB 870, analytical result storage DB 880, and security information DB 890. Each of authentication processor 820, log collector 830, log analyzer 840, security information generator 850, and log-collection target vehicle selector 855 is a functional component implementable by a processor that processes information by executing a control program stored in the storage device, for example. Each of vehicle information DB 860, ECU information DB 865, vehicle log storage DB 870, analytical result storage DB 880, and security information DB 890 is a functional component implementable by, for example, a processor that manages (generates, edits, and stores) data in the storage device by executing a control program stored in the storage device. The storage device implementing these databases is an example of a storage according to the present embodiment.

Communicator 810 is implemented by, for example, a communication interface and a processor executing a control program stored in the memory. By communicating with each of vehicles 1010 via network 81, communicator 810 receives information included in a frame (message) transmitted on the CAN bus of the in-vehicle network of vehicle 1010 or a log including time-series data indicating, for example, information about the frame. The information included in the frame indicates: an ID of the frame (message ID) received from the CAN bus through the in-vehicle network; a length of a data field indicated by a DLC; and data content stored in the data field of the frame (message). The information about the frame indicates, for example, timing of receiving frames having the same message ID (a time interval between receptions or a frequency of reception, for instance). Hereinafter, the information included in the frame and the information about the frame that is indicatable by the log may also be referred to collectively as "frame information".

Communicator 810 functions as an obtainer that receives the log from the vehicle to obtain such frame information about the frame transmitted and received over the in-vehicle network of the vehicle. Moreover, communicator 810 transmits transmission information about security that is generated by security information generator 850. Examples of the transmission information include: presentation information for giving an alert (warning) notice to, for example, a passenger of the vehicle; control information indicating an instruction to control running of the vehicle, for example; control information indicating an instruction to update an encryption key used for applying an encryption process to the vehicle; and fraud detection information for detecting, on the vehicle side, fraud related to a frame. Communicator 810 transmits a request for transmission of a log, to a log-collection target vehicle selected by log-collection target vehicle selector 855 (described later). This request may include an instruction about information to be included in the log requested of the target vehicle to transmit. The information may be a frame ID or an ECU ID indicating the ECU related to the frame to be transmitted, for example.

Authentication processor 820 has an encryption processing function. When communicating with vehicle 1010, authentication processor 820 performs mutual authentication processing between vehicle 1010 and vehicle anomaly detection server 80. The encryption processing allows authentication processor 820 to establish a secure channel. For example, the encryption processing function enables authentication processor 820 to decode the encrypted log received by communicator 810 from the vehicle on the basis of the mutual authentication, and to encrypt the transmission information to be transmitted to the vehicle. Here, the DBs held by vehicle anomaly detection server 80 may include information confidential to parties concerned (such as the car manufacturer and the management company illustrated in FIG. 2). For such a case, vehicle anomaly detection server 80 uses the encryption processing function of authentication processor 820 to encrypt the information and then stored the encrypted information into the DBs.

Log collector 830 stores various kinds of information included in the logs collected from vehicles 1010 (for example, the frame information about the frame transmitted and received over the in-vehicle networks), into vehicle log storage DB 870. When storing the various kinds of data into vehicle log storage DB 870, log collector 830 may perform a process, such as a predetermined normalization process, on the various kinds of data. The data (vehicle log information) stored in vehicle log storage DB 870 is described later, with reference to another drawing.

Log analyzer 840 calculates an anomaly level as an index of whether the frame received on the in-vehicle network of vehicle 1010 is anomalous (whether an attack frame is transmitted to the in-vehicle network by an attacker), by analyzing the log collected from vehicle 1010 and stored (accumulated) into vehicle log storage DB 870. Log analyzer 840 is capable of performing, for example, a statistical process on frame information about a plurality of frames collected from the vehicles that is indicated by accumulated logs. On the basis of the frame information about the plurality of frames obtained by communicator 810 and about the frame received on the in-vehicle network of one of vehicles 1010 (vehicle 1010a, for example) obtained by communicator 810 after the obtainment of the plurality of frames, log analyzer 840 functions as a calculator that calculates an anomaly level (severity of anomaly) of this frame received on the in-vehicle network of the one of vehicles 1010.

Log analyzer 840 may construct, for example, a predetermined model for a frame transmitted and received over the in-vehicle network in a normal state. This predetermined model is usable for comparison with a frame transmitted and received over the in-vehicle network in an anomalous state. Then, log analyzer 840 may adjust (or update) the predetermined model through machine learning based on a log obtained sequentially. When logs are obtained sequentially, the predetermined model may be updated sequentially. This enables immediate and appropriate handling of an unknown attack pattern.

In these cases, log analyzer 840 is capable of performing processing (such as a multivariate analysis) on the frame information about the plurality of frames indicated by the collected logs, as appropriate. Then, log analyzer 840 is capable of providing this result for learning of the predetermined model. The learning of the predetermined model may be achieved by either supervised or unsupervised learning. For example, suppose that the in-vehicle network system of vehicle 1010 has a fraud detection function of detecting, on the basis of a predetermined rule, that a frame inappropriate for the predetermined rule (that is, a fraudulent frame) is transmitted on the CAN bus. In this case, the log may include distinction information as to whether the present frame is fraudulent or non-fraudulent. Then, log analyzer 840 may perform supervised learning on the predetermined model on the basis of the distinction information.

Moreover, log analyzer 840 may collect logs about non-fraudulent frames from vehicles 1010 or collect logs without the distinction information indicating whether the frames are fraudulent, for example. On the basis of such collected logs, log analyzer 840 may perform unsupervised learning on the predetermined model. This predetermined model is used for calculating the anomaly level of the frame received on the in-vehicle network of one of vehicles 1010. It is sufficient that details of the predetermined model are usable for calculating the anomaly level of the frame. The anomaly level is calculated through: a comparison between the frame information and the predetermined model; an arithmetic operation; a logical operation; or a conditional judgement. More specifically, the anomaly level is calculated through arithmetic processing using the frame information and the predetermined model. For example, on the basis of the log information of the vehicles of the same type, log analyzer 840 is capable of constructing the predetermined model that indicates distribution of a feature amount (such as a feature vector including components of frame data content, a time interval between receptions of frames having the same ID, and a frequency of reception of such frames) of the frame received on the in-vehicle network in the normal state. When the anomaly level is an objective variable and the log information is an explanatory variable, the predetermined model may indicate a relationship between the objective variable and the explanatory variable. For example, the anomaly level may be 0 (zero) when no anomaly is detected (i.e., in the normal state), and may be a positive value appropriate to the severity of anomaly when an anomaly is detected. The anomaly level may be binary and take 0 (no anomaly detected, for example) and 1 (anomaly detected, for example). Alternatively, the anomaly level may take three or more values to classify the detected anomaly into a plurality of levels. An anomaly may be determined as being present when the anomaly level exceeds a predetermined threshold. As an example, the anomaly level of the frame received on the in-vehicle network of one of vehicles 1010 may be calculated by determining whether the feature amount of this frame is within a range having a boundary threshold determined by multiplying, by a predetermined coefficient (3, for example), a standard deviation of the distribution (such as a normal distribution identified by an average value and dispersion) of the feature amount indicated by the predetermined model determined based on the already-collected logs. Moreover, the anomaly level may be classified into the plurality of levels using a plurality of predetermined coefficients. Examples of the method of constructing the predetermined model used for calculating the anomaly level include an outlier detection method and a change-point detection method for detecting a rapid change in a time series.

In this way, on the basis of the frame information about the plurality of frames received on the in-vehicle networks of vehicles 1010 and indicated by the collected logs (the vehicle logs), log analyzer 840 calculates the anomaly level of the frame information about the frame that is received on the in-vehicle network of one of vehicles 1010 after the reception of the frame information about the plurality of frames. The frame information about the frame received on the in-vehicle network of this vehicle 1010 can be obtained from the log of this vehicle. The anomaly level calculated by log analyzer 840 is used for determination about details included in transmission information generated by security information generator 850, determination about a range of vehicles 1010 as destinations of the transmission information, and determination about transmission timing (a time) to transmit the transmission information, for example. When determining that the frame received on the in-vehicle network of vehicle 1010 has an anomaly on the basis of the anomaly level calculated for this frame (i.e., when detecting an attack frame), log analyzer 840 causes security information generator 850 to transmit the transmission information (such as a warning notice) to this vehicle and other vehicles 1010 under a certain condition. Moreover, log analyzer 840 performs various analytical processes, such as a statistical process based on the collected log information, an update (learning) process for the predetermined model, and a calculation process for the anomaly level of the frame received on the in-vehicle network of vehicle 1010. Then, log analyzer 840 stores the result of the analytical processes (for example, information indicating the updated predetermined model and information about the calculated anomaly level) into analytical result storage DB 880 for the reuse in the analytical processes (such as calculation of the anomaly level of a frame) next time.

Security information generator 850 determines: the details of the transmission information about security; the range of the vehicles as the destinations of the transmission information (for example, whether to transmit predetermined transmission information to the vehicles of the same type); and the transmission time to transmit the transmission information. Security information generator 850 makes these determinations on the basis of the anomaly level of the frame received on the in-vehicle network of vehicle 1010 that is calculated by log analyzer 840, by reference to vehicle information held by vehicle information DB 860 (see FIG. 7) and attack phase information (see FIG. 9) and alert level information stored in security information DB 890. These determinations are described later with reference to FIG. 7 and FIG. 8. In accordance with these determinations, security information generator 850 controls transmission of the transmission information, or more specifically, causes communicator 810 to transmit the transmission information to vehicle 1010 that is a transmission destination.

The method applying the statistical process, the multivariate analysis, or the machine learning as described above uses multiple levels to indicate the anomaly level of a phenomenon that is not determined as being anomalous with a method according to a predetermined rule. Examples of such a phenomenon include a sign of attack and occurrence of an attack frame related to an unknown attack pattern. Thus, appropriate handling can be achieved with more flexibility, on the basis of the anomaly level indicated using the multiple levels.

2.4 Vehicle Log Information

Figure 6:
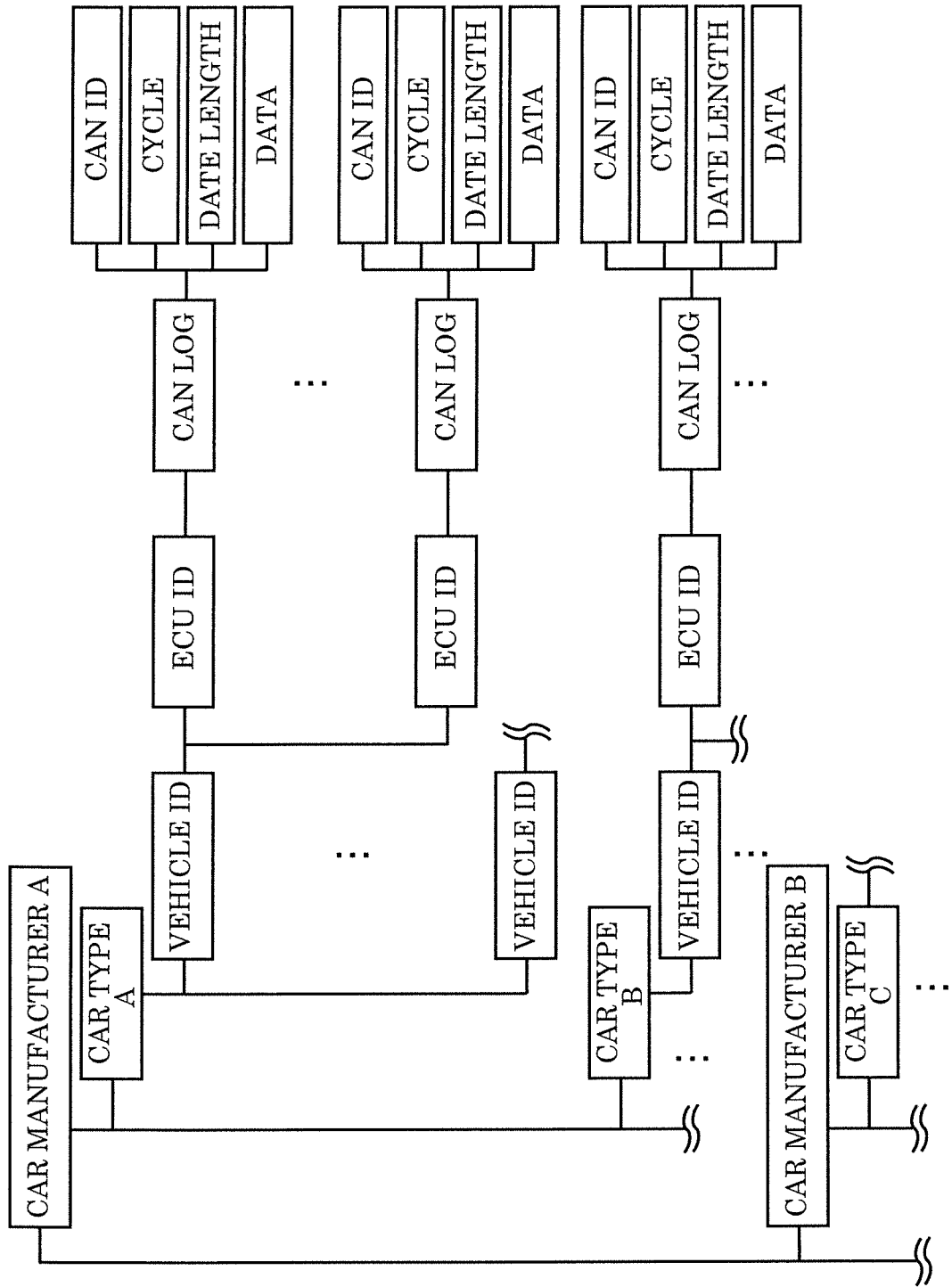
FIG. 6 is a block diagram illustrating an exemplary data structure of vehicle log information stored in a vehicle log storage database according to the embodiment.

FIG. 6 illustrates an exemplary data structure of vehicle log information stored in vehicle log storage DB 870 included in vehicle anomaly detection server 80. As shown in FIG. 6, the vehicle log information indicates each of the vehicles manufactured by a car manufacturer, in association with a car type, a vehicle ID for identifying the vehicle for each type, an ECU ID of the ECU included in the vehicle, and a log (CAN log in FIG. 6) indicating frame information about the frame transmitted by the ECU. This vehicle log information is a collection of logs obtained by vehicle anomaly detection server 80 from vehicles 1010. Here, a CAN log is data indicating information about the frame. For example, the CAN log indicates: identification information (ID [message ID]) of a CAN frame; a data length indicated by the DLC of the frame; information included in the frame, such as content in a data field of the frame; and a transmission cycle (reception cycle). The CAN log is information based on the log received from vehicle 1010. Each information item indicated by the CAN log may be a normalized feature amount (such as a feature vector) of the CAN frame based on the log information described above.

By analyzing this vehicle log information, log analyzer 840 calculates an anomaly level of a frame received on the in-vehicle network of vehicle 1010 to determine whether an anomaly is occurring to vehicle 1010.

2.5 Vehicle Information DB

FIG. 7 illustrates an exemplary data structure of vehicle information DB 860 included in vehicle anomaly detection server 80. As illustrated in FIG. 7, the vehicle information associates, for each car type, an ID for identifying an ECU included in a vehicle of this car type (for example, a model identifying the type of ECU) with an ID for identifying a type of a frame transmitted by this ECU (that is, a CAN message ID). The vehicle information includes, for each car type, the IDs of all the ECUs included in the vehicle of this type and the CAN message IDs of frames transmitted by the ECUs. However, FIG. 7 simply illustrates some of the IDs of the ECUs and some of the IDs of the frames transmitted by these ECUs, for the purpose of description.

Vehicle information table 861 illustrated as an example in FIG. 7 indicates that: each vehicle of car type A includes an ECU having an ID "001" and an ECU having an ID "002"; the ECU with the ID "001" transmits a frame having a message ID "100" and a frame having a message ID "101"; and the ECU with the ID "002" transmits a frame having a CAN message ID "200". Moreover, vehicle information table 861 indicates that: each vehicle of car type B includes an ECU having an ID "001" and an ECU having an ID "003"; the ECU with the ID "001" transmits a frame having a message ID "110" and a frame having a message ID "111"; and the ECU with the ID "003" transmits a frame having a CAN message ID "301". Although the vehicles of different car types include the ECUs having the same ID, these ECUs are not necessarily of the same kind. In this case, association of ECU IDs between different car types is obtained by reference to ECU information DB 865. For example, by reference to ECU information DB 865 before the processing, ECU IDs used by different car types may be converted into a common ECU ID used by vehicle anomaly detection server 80. This allows the ECUs having the same ECU ID but included in the vehicles of different types to be treated as the ECUs of the same kind (identical kinds) in the vehicle information DB of FIG. 7.

By reference to vehicle information table 861 and ECU information DB 865, log-collection target vehicle selector 855 is capable of selecting a car type provided with a specific ECU. By reference to vehicle information table 861, security information generator 850 is capable of adding, as a destination of the transmission information regarding security, a vehicle including an ECU of the same type as the ECU included in the vehicle transmitting an anomalous frame, under a certain condition based on the anomaly level.

FIG. 8 illustrates an exemplary data structure of car-type-specific information also stored in the vehicle information DB of vehicle anomaly detection server 80. As illustrated in FIG. 8, the car-type-specific information indicates, by geographical area, a vehicle ID of a vehicle that is a possible target of anomaly detection for each car type of each car manufacturer. Here, the geographical area refers to a registration area of the target vehicle, an area where the vehicle was located last time as a result of communication, a manufacturing location (manufacturing plant), or a place of destination, for example. The car-type-specific information is an example of a vehicle ID list according to the present embodiment.

2.6 Attack Phase Information

FIG. 9 illustrates an example of attack phase information stored in security information DB 890. In the attack phase information, attacks on the vehicle through transmission of attack frames are classified under a plurality of phases (four attack phases in this example). Each of the attack phases is associated with an alert level in this information. The attack phase information in the example of FIG. 9 associates a combination of an attack phase and number N of detections of this attack phase (the number of detections) with an alert level on a scale of 1 to 5. The number of detections may be a cumulative number or a number counted in a given unit of time. The alert level indicates a level of importance from a security perspective and is used by log-collection target vehicle selector 855 to select a log-collection target vehicle. Moreover, the alert level is an index used for determining a transmission manner in which vehicle anomaly detection server 80 transmits the transmission information about security to the vehicle.

This example divides attack phases into two broad categories: "attack sign" and "attack". Phase 1 to phase 3, which are three phases in order of increasing severity, are attack phases under the attack sign category. Phase 4 is an attack phase under the attack category and having the highest severity. Although most attacks are assumed to be started from phase 1 having the lowest severity, the order in which the attacks are executed is not limited to this.

The following describes, for each attack phase: a conceivable approach for making an attack sign or attack; an exemplary method of determining the attack phase; and the alert level.

2.6.1 Phase 1

Specifications of CAN frames (messages) (such as content and uses of a frame for each message ID) used on the in-vehicle network are typically undisclosed. Thus, an attacker prepares an attack by transmitting various CAN frames (messages) to the in-vehicle network of one vehicle via a diagnostic port (diagnostic port 710 in FIG. 4, for example) and then verifying behavior of the vehicle to analyze the specifications of the CAN frames. This analytical action continues by repeating a trial-and-error cycle until at least part, out of the desired specifications related to the CAN frames of the attack message, that is used for an attack is revealed. Aside from the analysis on the specifications of the CAN frames, the attacker also searches for a vulnerability of the in-vehicle network to transmit an attack frame to a CAN bus. In the attack phase information, this attack preparation phase is defined as phase 1 in the attack sign category.

For example, suppose that an anomaly level indicating occurrence of anomaly is calculated for a frame and that a message ID of this frame is not defined as being transmitted from the ECUs connected to the in-vehicle network in the normal state. Suppose also that the time interval between receptions (or transmissions) of this frame is different from that of a normal frame. In these cases, security information generator 850 may determine the present phase to be phase 1 in the attack sign category. For example, suppose that an anomaly level indicating occurrence of an anomaly is calculated for a frame and that a message ID of this frame indicates a diagnostic command and does not correspond to a phase higher (in severity) than phase 1. In this case, security information generator 850 may determine the present phase to be phase 1 in the attack sign category. The diagnostic command refers to a frame including a specific message ID (a diagnostic message ID) defined as being used by a normal diagnostic tool previously connected to the diagnostic port, for example. Note that any other method may be used for determining whether the present phase is phase 1 in the attack sign category.

The attack phase information illustrated as an example in FIG. 9 associates phase 1 with an alert level "1" regardless of the number of detections. Thus, when determining that the present phase is phase 1, security information generator 850 performs control to transmit the transmission information to the vehicle in a transmission manner corresponding to the alert level "1".

2.6.2 Phase 2

If finding a vulnerability of a device or an ECU related to the in-vehicle network of a vehicle of a given car type, the attacker attempts to control this device or ECU by exploiting the vulnerability. For example, suppose that the head unit is capable of downloading software, such as an application program, from an external network and that the head unit has an untreated vulnerability. In this case, the attacker disguisedly releases malware (such as malicious software intended for a fraudulent act) for head units and then exploits the vulnerability by causing the user to unintentionally download this malware. The attacker may exploit this vulnerability via an external device connected to the head unit. For example, if the head unit is connectable to a smartphone, the attacker disguisedly releases malware on an Internet site for instance and causes the user to unintentionally download this malware to the smartphone. Then, when the user connects the smartphone to the head unit, the attacker may exploit the vulnerability of the head unit via the malware on the smartphone. After this, to construct an attack base to make a fraudulent access to a CAN bus, the attacker exploiting the vulnerability of the head unit is assumed to fraudulently overwrite software (such as firmware) of the head unit using the malware. As a result of this, the attacker gains control over the head unit. In the attack phase information, this attack preparation phase is defined as phase 2 in the attack sign category. Here, suppose that a vulnerability is present in an ECU (like ECU 302 in the example of FIG. 4) directly connected to an external network, such as a vehicle-to-vehicle (V2V) ECU or a vehicle-to-infrastructure (V2I) ECU. In this case, the attacker may take over this ECU by bypassing, for example, the head unit to fraudulently overwrite the software of this ECU. Such an act enabling fraudulent access to the CAN bus is also defined as phase 2 in the attack sign category. More specifically, the phase of fraudulently overwriting the software (such as the firmware) of the ECU is defined as phase 2 in the attack sign category.

For example, suppose that an anomaly level indicating occurrence of an anomaly is calculated for a frame and that a message ID of this frame is defined as an ID of a frame for updating firmware of an ECU. In this case, security information generator 850 may determine the present phase to be phase 2 in the attack sign category. Note that any other method may be used for determining whether the present phase is phase 2 in the attack sign category. For example, the method may verify whether the firmware updating frame is transmitted to a CAN bus at a wrong time for updating.

The attack phase information illustrated as an example in FIG. 9 associates phase 2 with an alert level "2" when the number of detections is 1, and with an alert level "3" when the number of detections exceeds 1. Thus, when determining that the present phase is phase 2, security information generator 850 performs control to transmit the transmission information to the vehicle in a transmission manner corresponding to the alert level "2" when the number of detections of phase 2 is 1. Similarly, security information generator 850 performs control to transmit the transmission information to the vehicle in a transmission manner corresponding to the alert level "3" when the number of detections of phase 2 is 2 or more.

2.6.3 Phase 3

Suppose that the attack base has already been constructed in the in-vehicle network of a vehicle of a specific car type by, for example, malware fraudulently overwriting the software of the ECU in phase 2 under the attack sign category. After this, to verify the vehicle information, like the car type, of the vehicle that this malware is currently accessing, the malware attempts to obtain the vehicle ID and the ECU information (such as the ECU ID and the ECU name) by transmitting a diagnostic command or the like to a CAN bus. In the attack phase information, this phase is defined as phase 3 in the attack sign category.

For example, suppose that an anomaly level indicating occurrence of an anomaly is calculated for a frame and that a message ID of this frame is a message ID of a diagnostic command for obtaining the vehicle ID and the ECU information. In this case, security information generator 850 may determine the present phase to be phase 3 in the attack sign category. Note that any other method may be used for determining whether the present phase is phase 3 in the attack sign category.

The attack phase information illustrated as an example in FIG. 9 associates phase 3 with an alert level "3" when the number of detections is 1, and with an alert level "4" when the number of detections exceeds 1. Thus, when determining that the present phase is phase 3, security information generator 850 performs control to transmit the transmission information to the vehicle in a transmission manner corresponding to the alert level "3" when the number of detections of phase 2 is 1. Similarly, security information generator 850 performs control to transmit the transmission information to the vehicle in a transmission manner corresponding to the alert level "4" when the number of detections of phase 3 is 2 or more.

2.6.4 Phase 4

After obtaining the information including the car type in phase 3 of the attack sign category, the malware accesses a fraudulent server of the attacker. Then, the malware receives, from the fraudulent server, a CAN attack set indicating, for example, a procedure for transmitting a CAN attack frame corresponding to the present car type. The CAN attack set is prepared by the attacker to fraudulently control, for example, running of the vehicle. The CAN attack set indicates, for each car type, content of frame groups and an order in which the frames are to be transmitted to the in-vehicle network of the vehicle. The malware carries out the attack by transmitting the attack frame to the CAN bus on the basis of the CAN attack set, and then fraudulently controls the vehicle. In the attack phase information, this phase is defined as phase 4 in the attack category.

For example, suppose that an anomaly level indicating occurrence of an anomaly is calculated for a frame and that a message ID of this frame is one of message IDs defined as IDs of control frames important for the vehicle receiving this frame. In this case, security information generator 850 may determine the present phase to be phase 4 in the attack category. The important control frames may be freely defined according to importance, and may relate to running, for example. The frames relating to running refer to frames defined as being transmitted by the powertrain-related and chassis-related ECUs (such as the engine ECU, the transmission ECU, the brake ECU, and the steering ECU) that relate to control of running and behavior of the vehicle, such as "running", "making a turn", and "stopping". Note that any other method may be used for determining whether the present phase is phase 4 in the attack category. For example, the method may determine whether an attack is being attempted, by comparing frame content indicating a control instruction for the actuator located inside the vehicle with frame content indicating a state of the vehicle reflecting the action of the actuator.

The attack phase information illustrated as an example in FIG. 9 associates phase 4 with an alert level "4" when the number of detections is 1, and with an alert level "5" when the number of detections exceeds 1. Thus, when determining that the present phase is phase 4, security information generator 850 performs control to transmit the transmission information to the vehicle in a transmission manner corresponding to the alert level "4" when the number of detections of phase 4 is 1. Similarly, security information generator 850 performs control to transmit the transmission information to the vehicle in a transmission manner corresponding to the alert level "5" when the number of detections of phase 4 is 2 or more.

2.7 ECU Information DB

FIG. 10 illustrates an exemplary data structure of an ECU ID conversion table stored in ECU information DB 865 included in vehicle anomaly detection server 80. The ECUs of the same kind may have different ECU IDs for identifying these ECUs, depending on the car manufacturer or car type. The ECU ID conversion table illustrated in FIG. 10 is used for converting an ECU ID of a given car type into an ECU ID of a different car type. In the ECU ID table in FIG. 10, the ECUs in the same row are of the same kind. For example, the ECU ID conversion table in FIG. 10 indicates that the ECU identified by the ECU ID "001" of car type A is also identified by the ECU ID "001" of car type B. Additionally, the table indicates that an ECU of this kind is not included in vehicles of car types C and D. The table also indicates that the ECU identified by the ECU ID "002" of car type A is identified by the ECU ID "104" of car type B and by the ECU ID "012" of car type C. Additionally, the table indicates that an ECU of this kind is not included in vehicles of car type D. To select a car type that includes an ECU of a given kind, log-collection target vehicle selector 855 is capable of selecting all the car types that include the ECUs of the same kind but with the IDs different between the car types, by reference to this ECU ID conversion table. The ECUs of the same kind can be included in the vehicles of different types. The frames transmitted by the ECUs of the same kind that are included in the vehicles of different types simply have different message IDs, but are identical in content (such as the data length indicated by the DLC and the data in the data field) and in the frame transmission cycle, for example.

ECU information DB 865 may include a message ID conversion table having a data structure illustrated as an example in FIG. 11. The frames of the same kind according to the information indicated by the data in the data fields may have different message IDs for identifying this kind, depending on the car manufacturer or car type. The message ID conversion table illustrated in FIG. 11 is used for converting a message ID of a given car type into a message ID of a different car type. In the message ID table in FIG. 11, the frames in the same row are of the same kind. For example, the message ID conversion table in FIG. 11 indicates that the frame identified by the message ID "000" of car type A is also identified by the ECU ID "000" for each of car types B, C, and D. The table also indicates that the frame identified by the message ID "001" of car type A is identified by the message ID "010" of car type B, by the message ID "002" of car type C, and by the message ID "005" of car type D. To select a car type that includes an ECU transmitting a frame of a given kind, log-collection target vehicle selector 855 is capable of selecting all the car types that include the ECUs transmitting the frames of the same kind but with the IDs different between the car types, by reference to this message ID conversion table. FIG. 11 illustrates an example of second vehicle information according to the present embodiment.

Figure 12:
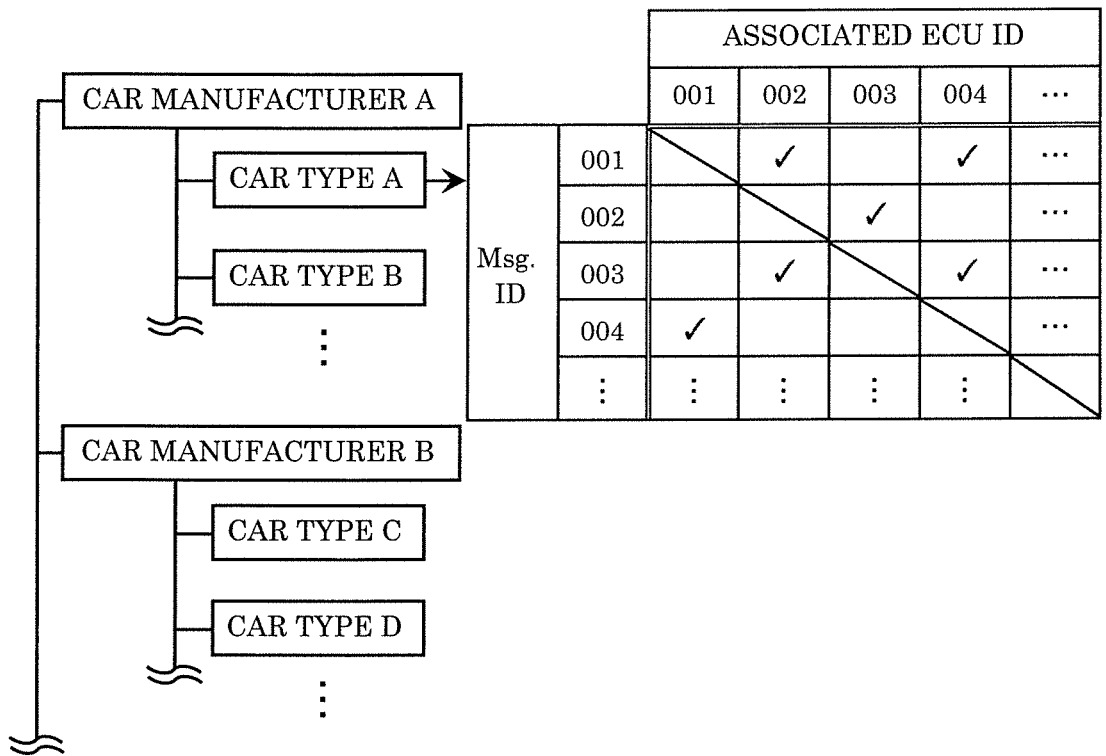
FIG. 12 illustrates an example of a table that associates car-type-specific message IDs with ECUs, the table being stored in the ECU information database according to the embodiment.

ECU information DB 865 may include a table that associates car-type-specific message IDs with ECUs illustrated as an example in FIG. 12. Suppose that an anomaly is determined as being occurring because the anomaly level calculated from given frame information of a given car type exceeds a certain level. In this case, the ECU ID of the related ECU can be obtained from the message ID of this frame, by reference to this table associating car-type-specific message IDs with ECUs. For example, this table associating car-type-specific message IDs with ECUs illustrated in FIG. 12 indicates that when the anomaly level of the frame information of a given frame of car type A is high and the message ID (indicated in a column on the right-hand side of the heading "Msg. ID" in FIG. 12) of this frame is "001", the ECUs assumed related to this frame, or more specifically, related to the anomaly are the ECU having the ECU ID "002" and the ECU having the ECU ID "004". The related ECU referred to here may be an ECU transmitting or receiving the frame having this message ID, for example. The table associating car-type-specific message IDs with ECUs is an example of first vehicle information according to the present embodiment.

Figure 13:
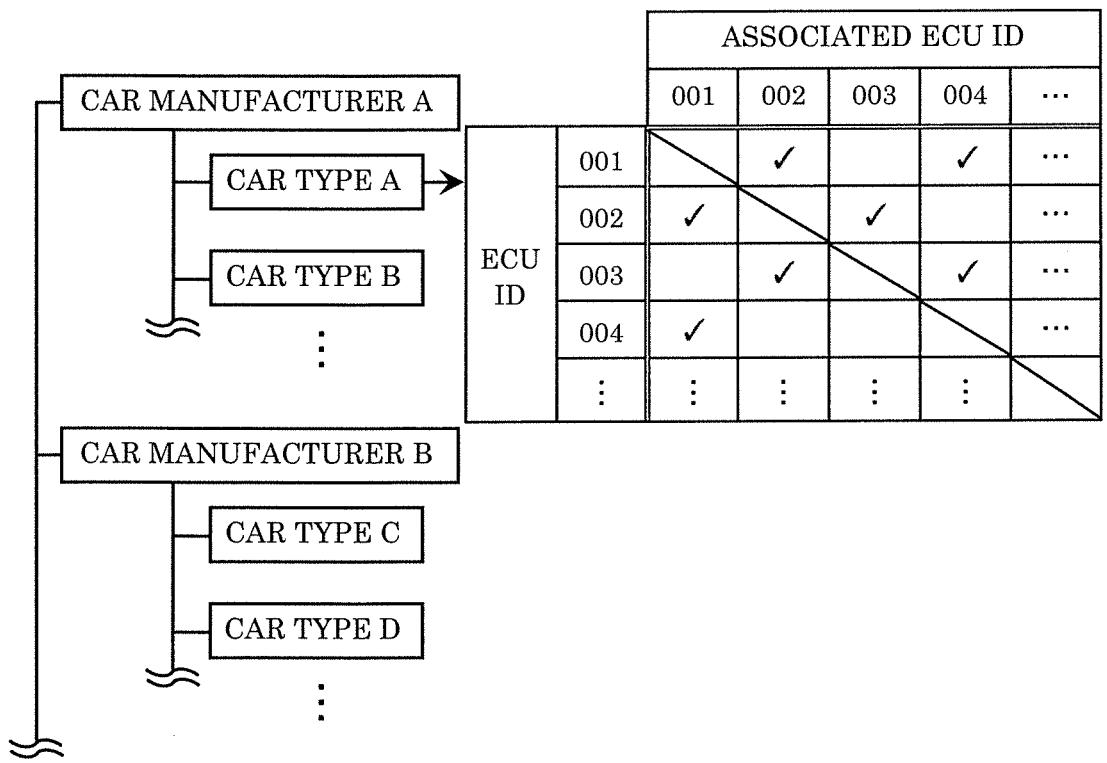
FIG. 13 illustrates an example of a car-type-specific ECU association table stored in the ECU information database according to the embodiment.

ECU information DB 865 may include a car-type-specific ECU association table illustrated as an example in FIG. 13. Suppose that an anomaly is determined as being occurring because the anomaly level calculated from information about a given frame of a given car type exceeds a certain level. In this case, the ECU ID of the related ECU transmitting this frame can be obtained by reference to this car-type-specific ECU association table. For example, this car-type-specific ECU association table illustrated in FIG. 13 indicates that the ECU IDs of the ECUs related to the ECU ID "001" of car type A are the ECU IDs "002" and "004". The related ECU referred to here may be a transmission destination of this frame, an ECU performing frame transmission and reception with the present ECU, or an ECU implementing the same function as the present ECU. The car-type-specific ECU association table is an example of associated information-processing-device information according to the present embodiment.

2.8 Configuration of Gateway

Figure 14:
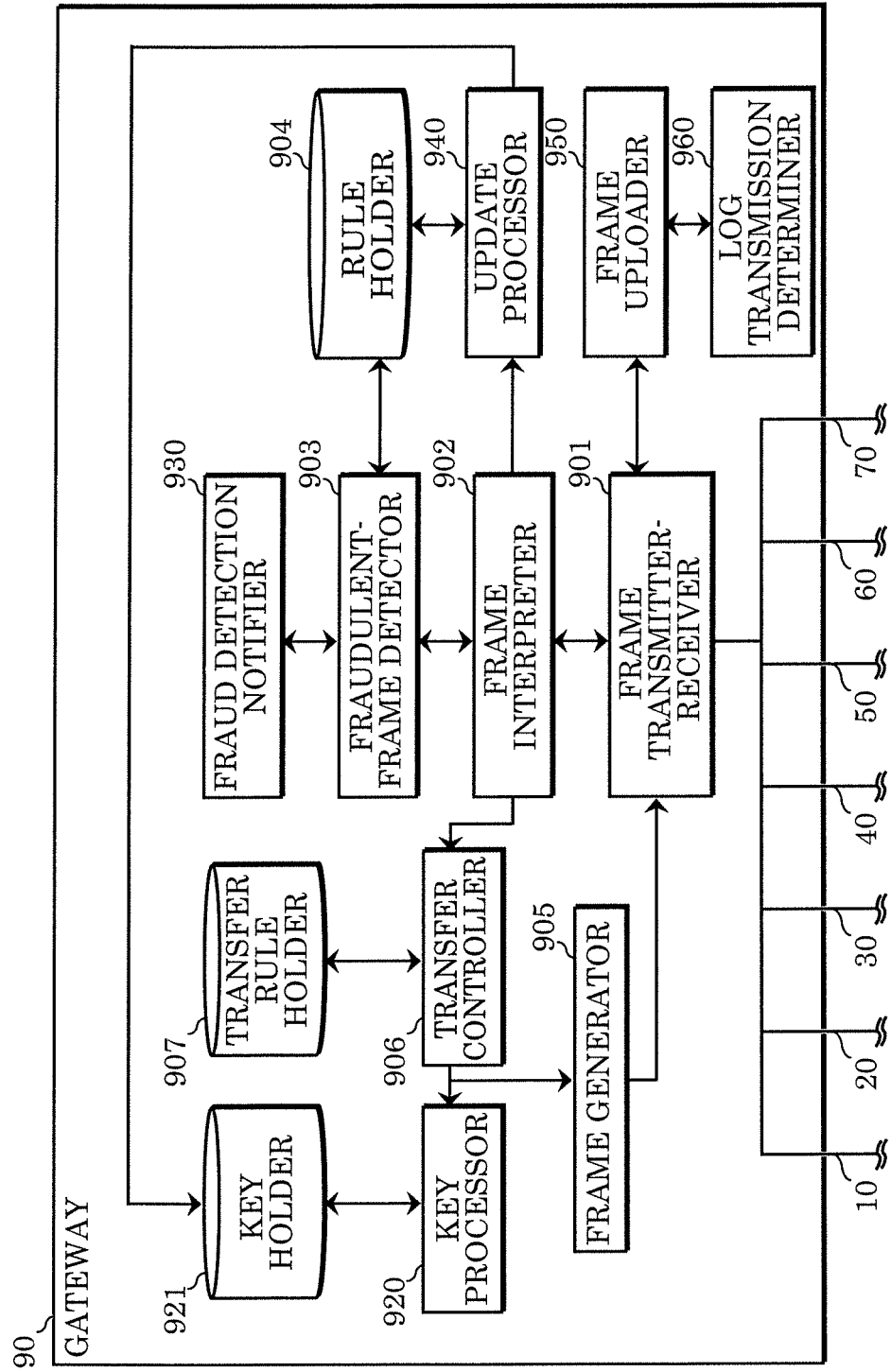
FIG. 14 is a block diagram illustrating an exemplary functional configuration of a gateway provided for a vehicle included in the vehicle anomaly detection system.

FIG. 14 is a block diagram illustrating an exemplary functional configuration of gateway 90 included in the in-vehicle network of vehicle 1010. As illustrated, gateway 90 includes, as functional structural components, frame transmitter-receiver 901, frame interpreter 902, fraudulent-frame detector 903, rule holder 904, frame generator 905, transfer controller 906, transfer rule holder 907, key processor 920, key holder 921, frame uploader 950, fraud detection notifier 930, and update processor 940. Each of these functional structural components is implemented in gateway 90 by, for example, the communication circuit and the processor or digital circuit executing the control program stored in the memory. For example, frame uploader 950 and update processor 940 are implemented by the communication circuit for communicating with vehicle fraud detection server 80.

Frame transmitter-receiver 901 transmits and receives frames to and from buses 10, 20, 30, 40, 50, 60, and 70 according to the CAN protocol. Frame transmitter-receiver 901 receives a frame one bit at a time from the bus and then notifies frame interpreter 920 of the received frame. Frame transmitter-receiver 901 transmits content of the frame, one bit at a time, to a transfer-destination bus included among buses 10, 20, 30, 40, 50, 60, and 70, on the basis of a transmission frame and bus information notified by frame generator 905 and indicating the transfer-destination bus.

Frame interpreter 902 receives frame values from frame transmitter-receiver 901, and then interprets and maps the values into fields in a frame format defined by the CAN protocol. Frame interpreter 902 notifies fraudulent-frame detector 903 of information about the fields of the received frame. When determining that the received frame does not conform to the CAN protocol, frame interpreter 902 instructs frame generator 905 to transmit an error frame. When receiving an error frame from another ECU, that is, when interpreting that an error frame is received on the basis the values of this received frame, frame interpreter 902 discards this frame after this, or more specifically, terminates interpretation of this frame.

Fraudulent-frame detector 903 determines whether the received frame is fraudulent by reference to information (fraud detection information) indicating a rule or algorithm (such as a fraud detection program) held by rule holder 904 and used for determining whether the received frame is fraudulent (used for detecting a fraudulent frame). Examples of the information indicating this fraudulent-frame detection rule or algorithm include a white list of conditions (identifying information) under which reception of a CAN frame (message) is allowed and a black list of conditions under which no reception is allowed. A fraudulent frame refers to a frame that does not meet the fraudulent-frame detection rule. When determining that the received frame is a fraudulent frame, fraudulent-frame detector 903 performs control to disable the fraudulent frame, which is currently being transmitted, by transmitting an error frame to the bus to which the fraudulent is being transmitted. More specifically, when the fraudulent frame is detected, fraudulent-frame detector 903 disables the fraudulent frame by transmitting the error frame to frame transmitter-receiver 901. Moreover, fraudulent-frame detector 903 notifies frame interpreter 902 of a result of the determination whether the received frame is fraudulent. When fraudulent-frame detector 903 does not determine that the received frame is fraudulent, frame interpreter 902 notifies transfer controller 906 of information in the fields of this frame. When determining that the received frame is fraudulent (When the fraudulent frame is detected), fraudulent-frame detector 903 notifies fraud detection notifier 930 of information about this fraudulent frame (such as information indicating the fraud detection or information indicating the fraud detection and content of the fraudulent frame). Here, to sufficiently obtain the information indicating the content of the fraudulent frame when the received frame is determined as being fraudulent, fraudulent-frame detector 903 may transmit the error frame to disable the fraudulent frame immediately only after a specific part (a data field, for example) of the fraudulent frame is received.

In accordance with transfer rule information held by transfer rule holder 907, transfer controller 906 selects the bus as the transfer-destination bus on the basis of the ID (message ID) of the received frame and the transfer-source bus (that is, the bus that received this frame). Then, to request the transmission, transfer controller 906 notifies frame generator 905 of bus information indicating the transfer-destination bus and content of the frame to be transferred (such as the message ID, the DLC [data length], and the data [content in the data field] notified by frame interpreter 902).

Transfer rule holder 907 holds transfer rule information indicating a frame transfer rule for each of the buses. The transfer rule information indicates each possible transfer-source bus in association with the transfer-destination bus and the message ID of the frame received and to be transferred on this bus. The transfer rule information includes information indicating whether the frame content is required to be encrypted on the present bus and whether the frame is required to have a MAC on the present bus (i.e., whether the present bus is connected to an ECU supporting MAC). To transfer a frame, transfer controller 906 refers to this information to perform the processes for encryption and MAC attachment. When the transfer destination supports MAC, transfer controller 906 performs control to cause key processor 920 to generate a MAC using a MAC key held by key holder 921 and transfer the frame having the MAC. When the transfer source supports encryption, transfer controller 906 causes key processor 920 to decode the frame content using an encryption key held by key holder 921 and shared among the ECUs connected to the transfer-source bus. When the transfer destination supports encryption, transfer controller 906 causes key processor 920 to encrypt and transfer the frame content using an encryption key held by key holder 921 and shared among the ECUs connected to the transfer-destination bus. Key processor 920 may use any methods for encrypting the frame content and for generating the MAC based on, for example, the frame content. The MAC may be generated based on a partial value in the data field of the frame, for example. Alternatively, the MAC may be generated based on a combination of the partial value and a value in a different field or other information (such as a counter value indicating the number of frame receptions). The MAC may be calculated using a hash-based message authentication code (HMAC) or cipher block chaining message authentication code (CBC-MAC), for example.

In response to the transmission request from transfer controller 906, frame generator 905 generates a transmission frame using the frame content notified by transfer controller 906. Then, frame generator 905 notifies frame transmitter-receiver 901 of this transmission frame and the bus information (such as the identifier of the transfer-destination bus).

When fraudulent-frame detector 903 detects a fraudulent frame, fraud detection notifier 930 notifies, for example, a driver of this fraud detection. To do so, fraud detection notifier 930 performs control (controls frame transmitter-receiver 901) to notify the head unit of information about the fraudulent frame (such as information indicating the fraud detection or information indicating the fraud detection and content of the fraudulent frame). When fraudulent-frame detector 903 detects a fraudulent frame, fraud detection notifier 930 may, for example, perform control to notify vehicle anomaly detection server 80 of log information including: information indicating the fraud detection; and information about the fraudulent frame. The log information included in this fraud detection notification makes the fraudulent frame distinguishable from a non-fraudulent frame. Thus, such log information can be used by vehicle anomaly detection server 80 for supervised learning. The information indicating the fraud detection can also be used by vehicle anomaly detection server 80 for, for example, various notifications (such as transmissions to various transmission destinations including the car manufacturer and an ECU vendor).

Update processor 940 updates the information (such as the white list and the black list) indicating the fraudulent-frame detection rule or algorithm held by rule holder 904, on the basis of the information received from vehicle anomaly detection server 80.

Frame uploader 950 sequentially obtains the frame received by frame transmitter-receiver 901 from one of the buses. Then, frame uploader 950 transmits (uploads), to vehicle anomaly detection server 80, a log indicating the frame information (the content of the frame, the time interval between the frame receptions, and the frequency of frame reception, for example) of the received frame, on the basis of the determination made by log transmission determiner 960. Frame uploader 950 adds, to the log, the identification information of the vehicle (vehicle ID) that includes gateway 90. Frame uploader 950 may add other various kinds of information (such as vehicle state information and vehicle location information) to the log. Frame uploader 950 may perform processing on the frame content, the time interval between the frame receptions, and the frequency of frame reception so that such information about the received frame is handled more easily when vehicle anomaly detection server 80 performs the statistical process or machine learning, for example. The time interval between the frame receptions refers to a time interval between the time the present frame is received and the time a frame having the same ID as the present frame is received last time. The frequency of frame reception refers to the number of frames having the same ID as the present frame that have been received in a fixed unit time, for example. The aforementioned processing relates to data formatting and data analysis (such as multivariate analysis including principal component analysis) for the frame. The processing includes extracting the feature amount from the features, such as the frame content, the time interval between frame receptions, and the frequency of frame reception and then normalizing the extracted feature amount to reduce an information amount of the feature amount. The reduction in the information amount of the feature amount is achievable by, for example, representing the feature amount by a feature vector as corresponding components and then reducing the number of dimensions of the feature vector through the principal component analysis on the basis of the information obtained cooperatively with vehicle anomaly detection server 80. To reduce a traffic volume in communicating with vehicle anomaly detection server 80, frame uploader 950 may transmit a compressed log unconditionally or depending on a communication state, for example. Alternatively, frame uploader 950 may transmit the log including information about only a frame having a certain ID, or more specifically, only a frame having the ID designated by log transmission determiner 960.

In response to the transmission request from vehicle anomaly detection server 80, log transmission determiner 960 determines whether to transmit the log to vehicle anomaly detection server 80. Whenever receiving a frame from the bus, frame transmitter-receiver 901 may transmit the log including the frame information of the frame to vehicle anomaly detection server 80 for a given period of time in response to the transmission request from vehicle anomaly detection server 80. Alternatively, after receiving a plurality of frames, frame transmitter-receiver 901 may transmit the logs including the frame information of these frames to vehicle anomaly detection server 80. However, immediate transmission of the frame information of the frame received from the bus enables vehicle anomaly detection server 80 to immediately detect whether this frame is anomalous and thus to achieve immediate handling. Moreover, log transmission determiner 960 may instruct frame uploader 950 to add, to the log, the frame information about only one or more frames designated through the transmission request from vehicle anomaly detection server 80 among the frames received by frame transmitter-receiver 901 from the bus, instead of adding the frame information about all the received frames. Here, the transmission request may designate, instead of the frame ID, the ECU ID associated with transmission and reception of the frame. In this case, log transmission determiner 960 notifies frame uploader 950 of the message ID of the frame transmitted and received by the ECU having the ECU ID designated in the transmission request from vehicle anomaly detection server 80, as the frame ID of a log information transmission target.

In response to the transmission of the transmission information (such as an alert and control information) from vehicle anomaly detection server 80, gateway 90 receiving this transmission information transmits necessary information to a predetermined ECU via the bus on the basis of the transmission information, for example. This allows gateway 90 to present a warning to the driver or nearby vehicles, control running of vehicle 1010, and control withdrawing of the function, for example.

2.9 Anomaly Detection of Vehicle Anomaly Detection Server Performed Cooperatively with Vehicle Next, the following describes processing up to and including anomaly detection performed through cooperation between vehicle anomaly detection server 80 and vehicle 1010 having the configurations described above in the vehicle anomaly detection system according to the present embodiment.

Figure 15:
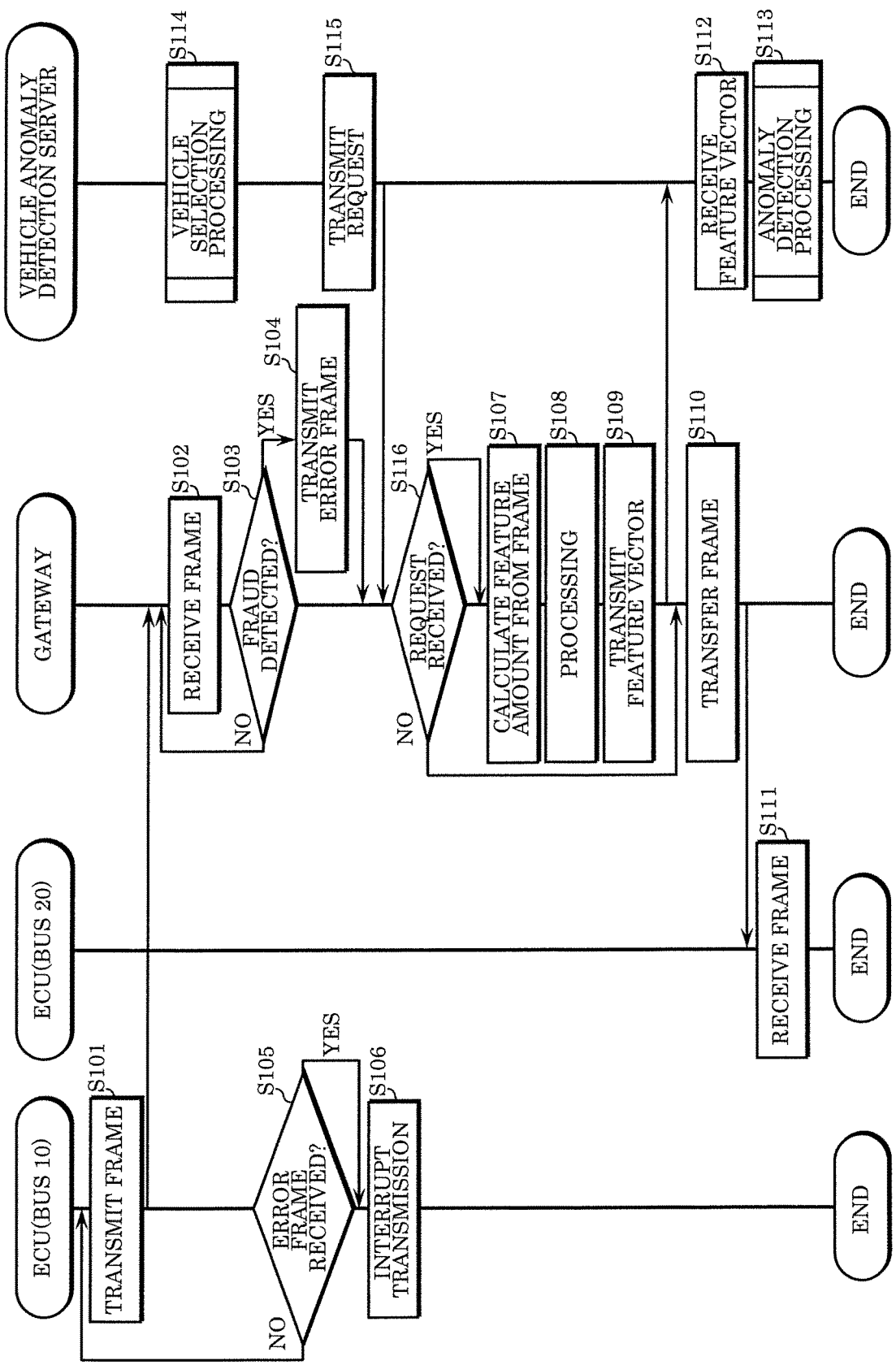
FIG. 15 is a sequence diagram illustrating an exemplary procedure up to and including anomaly detection performed by the vehicle anomaly detection system.

FIG. 15 is a sequence diagram illustrating an exemplary procedure up to and including anomaly detection performed by vehicle anomaly detection server 80 through cooperation with vehicle 1010. FIG. 15 mainly illustrates an example of an operation where one of vehicles 1010 transmits, to vehicle anomaly detection server 80, the log including the frame information about the frame (the feature vector obtained by processing the information about the frame in this example) transmitted and received over the in-vehicle network, and vehicle anomaly detection server 80 performs processes (anomaly detection processing) including calculation of an anomaly level of the frame. To be more specific, this operation is performed when gateway 900 of vehicle 1010 receives one frame from another ECU via the bus in the in-vehicle network. In this example, one of vehicles 1010 (vehicle 1010a, for example) transmits the log to vehicle anomaly detection server 80. However, the other vehicles 1010 (including vehicles 1010b, 1010c, 1010d, 1010e, and 10100 similarly transmit the logs to vehicle anomaly detection server 80. The following describes the operation with reference to FIG. 15.

One of the ECUs (such as engine ECU 100 or transmission ECU 101) connected to bus 10 of in-vehicle network of vehicle 1010 starts transmitting a CAN frame to bus 10 (Step S101).

Gateway 90 of vehicle 1010 receives, from bus 10, the frame transmitted in Step S101 (Step S102).

While the frame is being transmitted in Step S101, fraudulent-frame detector 903 of gateway 90 determines whether the frame received in Step S102 is fraudulent by reference to the information indicating the fraudulent-frame detection rule or algorithm (Step S103). If determining the frame as being fraudulent in Step S103 (YES in Step S103), gateway 90 transmits the error frame generated by frame generator 905 to disable the fraudulent frame before the completion of the frame transmission started in Step S101 (Step S104). When receiving this error frame via bus 10 (YES in Step S105), the ECU transmitting the frame interrupts the frame transmission (Step S106). The other ECUs connected to bus 10 also interrupts, when receiving this error frame, the reception of the frame started being transmitted in Step S101.

If not determining the frame as being fraudulent in Step S103 (NO in Step S103), gateway 90 verifies whether a transmission request has been received from vehicle anomaly detection server 80 after transmitting the error frame in Step S104 (Step S116). If the transmission request has not been received (NO in Step S116), this means that this vehicle 1010 is not selected as a monitoring target by vehicle anomaly detection server 80 at this time. Thus, gateway 90 proceeds to a frame transfer process (Step S110) without transmitting the frame information to vehicle anomaly detection server 80. If the transmission request has been received (YES in Step S116), gateway 90 determines (calculates) the feature amount of the received frame on the basis of frame content, a time interval between frame receptions, and a frequency of frame reception, for example (Step S107).

Subsequently, frame uploader 950 of gateway 90 performs the processing on the basis of the feature amount of the frame calculated in Step S107 (Step S108). Frame uploader 950 transmits, to vehicle anomaly detection server 80, the log including the feature vector (frame information) of the frame obtained as a result of the processing (Step S109).

Unless the received frame is determined as being fraudulent in Step S103, transfer controller 906 of gateway 90 transfers the frame (performs a process for transferring the frame on the basis of the transfer rule information) (Step S110). In the example illustrated in FIG. 15, the frame received in Step S102 is transferred to bus 20 through this frame transfer process. Then, brake ECU 200 or steering ECU 201 connected to bus 20 receives this transferred frame (Step S111).

Vehicle anomaly detection server 80 selects a vehicle as a monitoring target for anomaly detection (Step S114). Then, vehicle anomaly detection server 80 transmits, to the selected target vehicle, a request to transmit the log (Step S115). This vehicle selection is described later with reference to FIG. 16. Vehicle anomaly detection server 80 receives, from gateway 90, the log including the feature vector (frame information) of the frame transmitted and received over the in-vehicle network of vehicle 1010 (Step S112). Then, vehicle anomaly detection server 80 performs the anomaly detection processing using the received log including the feature vector (Step S113). The anomaly detection processing is described later with reference to FIG. 17.

2.10 Processing for Selecting Monitoring Target Vehicle

Figure 16:
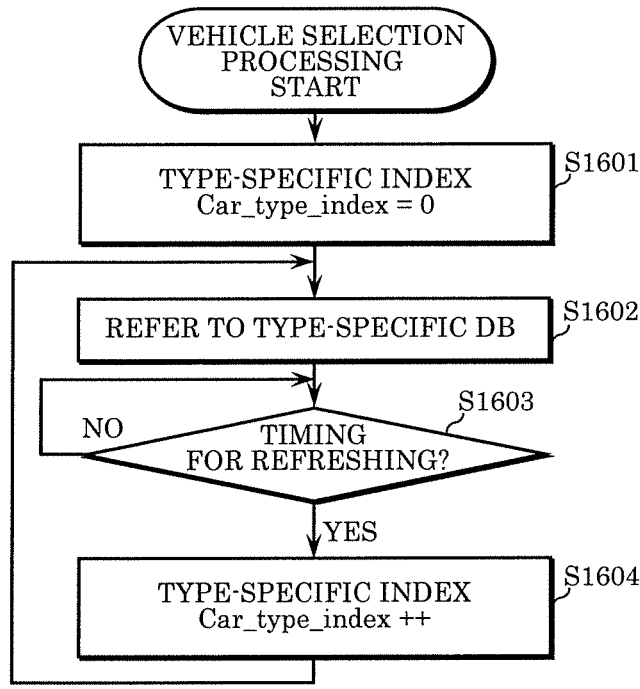
FIG. 16 is a flowchart of an exemplary procedure executed in a normal state by the vehicle anomaly detection server of the vehicle anomaly detection system to select a sample target vehicle for anomaly detection processing.

FIG. 16 is a flowchart of an example of the vehicle selection processing (Step S114 in FIG. 15) executed by vehicle anomaly detection server 80 at a normal state to select a monitoring target vehicle for anomaly detection. The following describes the vehicle selection processing with reference to FIG. 16.

Log-collection target vehicle selector 855 of vehicle anomaly detection server 80 has an index, for each car type, used for selecting a monitoring target vehicle, or more specifically, for selecting a target vehicle requested to transmit the frame information for anomaly determination (hereinafter, such a vehicle is referred to as the target vehicle) (Step S1601). Using this index, log-collection target vehicle selector 855 determines a vehicle ID of the target vehicle by reference to the car-type-specific information (see FIG. 8) held by the vehicle information DB (Step S1602). At timing of refreshing the index after the elapse of a certain period of time (Step S1603), log-collection target vehicle selector 855 refreshes the index (Step S1604). Then, log-collection target vehicle selector 855 determines the vehicle ID of the target vehicle again, by reference to the car-type-specific information (Step S1602).

To select the vehicle that is requested to transmit the frame information in this way is to sample the monitoring target vehicle. Thus, as compared to the case where all the vehicles transmit the frame information, congestion on network 81 and an overload on vehicle anomaly detection server 80 can be reduced.

The number of indexes used for selecting the target vehicle, that is, the number of vehicles among vehicles 1010 requested to transmit the frame information to vehicle anomaly detection server 80 around the same time, may be more than one for each car type. For example, the number of indexes may correspond to a total number of vehicles of the present car type. The number of indexes may vary depending on communication traffic congestion. The number of vehicles may be limited for congested communication whereas the number of target vehicles may be increased for non-congested communication. This suppresses an increase in traffic of network 81 caused by the operation of vehicle anomaly detection system. The number of target vehicles may vary depending on available calculation resources included in vehicle anomaly detection server 80.

The index may be refreshed through addition or subtraction of a constant value as in the above example or through random selection using, for example, random numbers.

In consideration of a region related to the vehicle, the target vehicles may be selected from one region in a concentrative manner or from multiple regions in a distributed manner.

2.11 Anomaly Detection Processing

Figure 17:
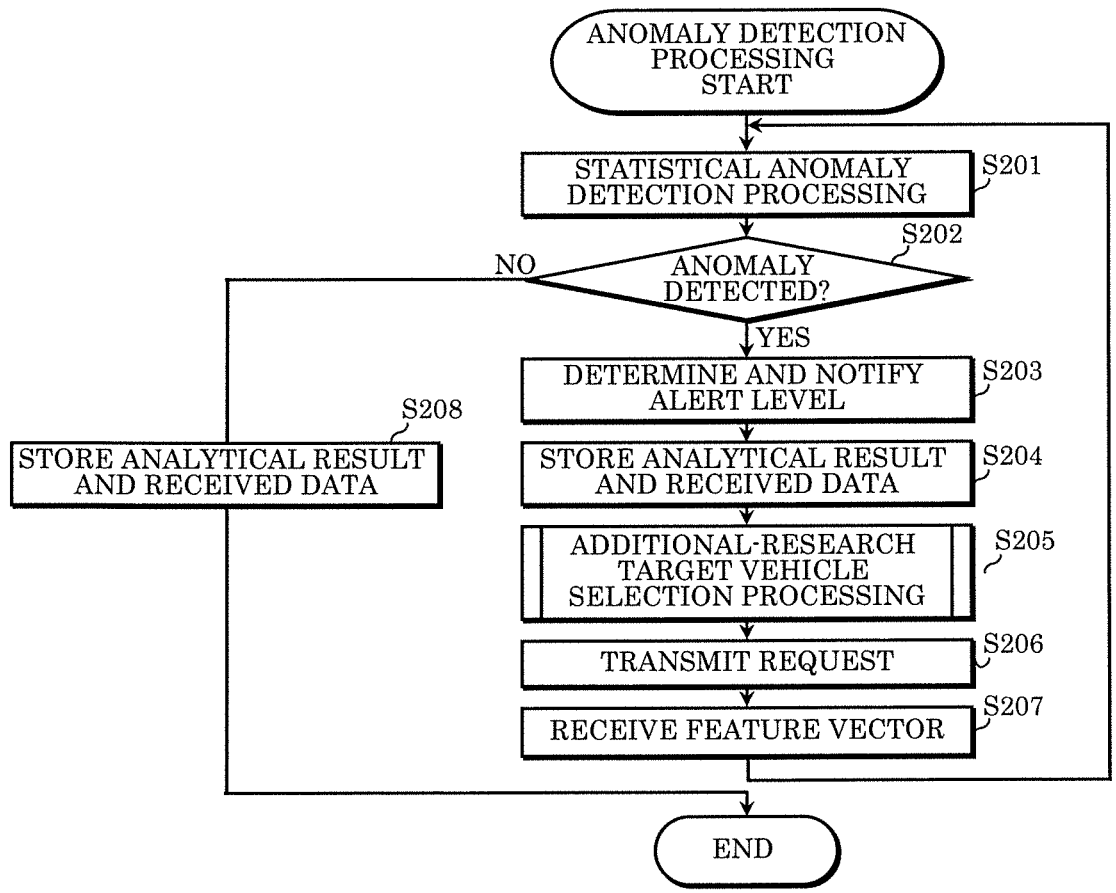
FIG. 17 is a flowchart of an exemplary anomaly detection procedure executed by the vehicle anomaly detection server included in the vehicle anomaly detection system.

FIG. 17 is a flowchart of an example of the anomaly detection processing (Step S113 in FIG. 15) executed by vehicle anomaly detection server 80. The following describes the anomaly detection processing with reference to FIG. 17.

Log analyzer 840 of vehicle anomaly detection server 80 performs statistical anomaly detection processing on the basis of the logs (the time-series data of the frame information about the frames transmitted and received over the in-vehicle networks of the vehicles) (Step S201). The statistical anomaly detection processing includes the process of constructing the predetermined model usable for comparison with the case in the anomalous state and the process of updating the predetermined model through machine learning. The processes are achieved by, for example, statistical processing and multivariate analysis based on the frame information about the frames transmitted and received over the in-vehicle networks, with reference to the log received from vehicles 1010 (i.e., the logs collected by log collector 830 and stored as the vehicle logs into vehicle log storage DB 870). Moreover, the statistical anomaly detection processing includes the process of calculating the anomaly level of the frame received by one of the vehicles (vehicle 1010a in this example). The anomaly level is calculated through the arithmetic processing (such as a comparison) performed between the aforementioned predetermined model based on the frames received on the in-vehicle networks of vehicles 1010 in the past and the frame information (the feature vector, for example) about the frame included in the log received from vehicle 1010a last time. This arithmetic processing may include outlier detection and change-point detection for detecting a rapid change in a time series. Log analyzer 840 performs these processes to calculate the anomaly level of the frame. Vehicle anomaly detection server 80 may calculate the anomaly level not only for the frame transmitted and received over the in-vehicle network of vehicle 1010a, but also for a frame received on the in-vehicle network of another one of vehicles 1010.

Next, in vehicle anomaly detection server 80, log analyzer 840 determines whether the frame is anomalous by determining whether the anomaly level calculated for the frame through the statistical anomaly detection processing in Step S201 is higher than the predetermined threshold (Step S202).

If the frame is determined as being anomalous in Step S202 (YES in Step S202), log analyzer 840 further determines the attack phase of this frame under the attack sign or attack category, on the basis of, for example, the identification information (the message ID) of the frame determined as being anomalous. By this determination, log analyzer 840 determines the alert level using the attack phase information (see FIG. 9) (or more specifically, determines the transmission manner including the details of the transmission information, the transmission time of the transmission information, and the range of the vehicles as the destinations of the transmission information). Thus, security information generator 850 is instructed to transmit the transmission information (including the alert and the control information) in the transmission manner corresponding to the determined alert level (Step S203).

Next, the result of the determination made in Step S202 or the information indicating the updated predetermined model obtained by the statistical anomaly detection processing in Step S201 is stored into analytical result storage DB 880 of vehicle anomaly detection server 80, and the log received from vehicle 1010 last time is stored into vehicle log storage DB of vehicle anomaly detection server 80 (Step S204).

If the frame is determined as being anomalous in Step S202 (YES in Step S202), log-collection target vehicle selector 855 of vehicle anomaly detection server 80 selects an additional-research target vehicle, to which the transmission request relating to anomaly detection is transmitted, using the identification information (message ID) of the frame determined as being anomalous (Step S205). The processing for selecting the additional-research target vehicle is described later. Then, vehicle anomaly detection server 80 transmits the log transmission request to the selected additional-research target vehicle (Step S206). The number of the additional-research target vehicles is one or more among vehicles 1010. The log transmission request is transmitted sequentially to each of the selected additional-research target vehicles. In response to the transmission requests, the logs including the frame information (the feature vector information) are received from these vehicles (Step S207). Then, the statistical anomaly detection processing in Step S201 is performed on these logs.

If not determining the frame as being anomalous in Step S202 (NO in Step S202), vehicle anomaly detection server 80 similarly, as in Step S204, stores the result of the determination made in Step S202 or the information indicating the updated predetermined model obtained by the statistical anomaly detection processing in Step S201 into analytical result storage DB 880, and similarly stores the log received from vehicle 1010 last time into vehicle log storage DB (Step S208).

Vehicle anomaly detection server 80 may update the predetermined model through machine learning in Step S204 or S208 for example, instead of during the statistical anomaly detection processing in Step S201.

2.12 Additional-Research Target Vehicle Selection Processing

Figure 18:
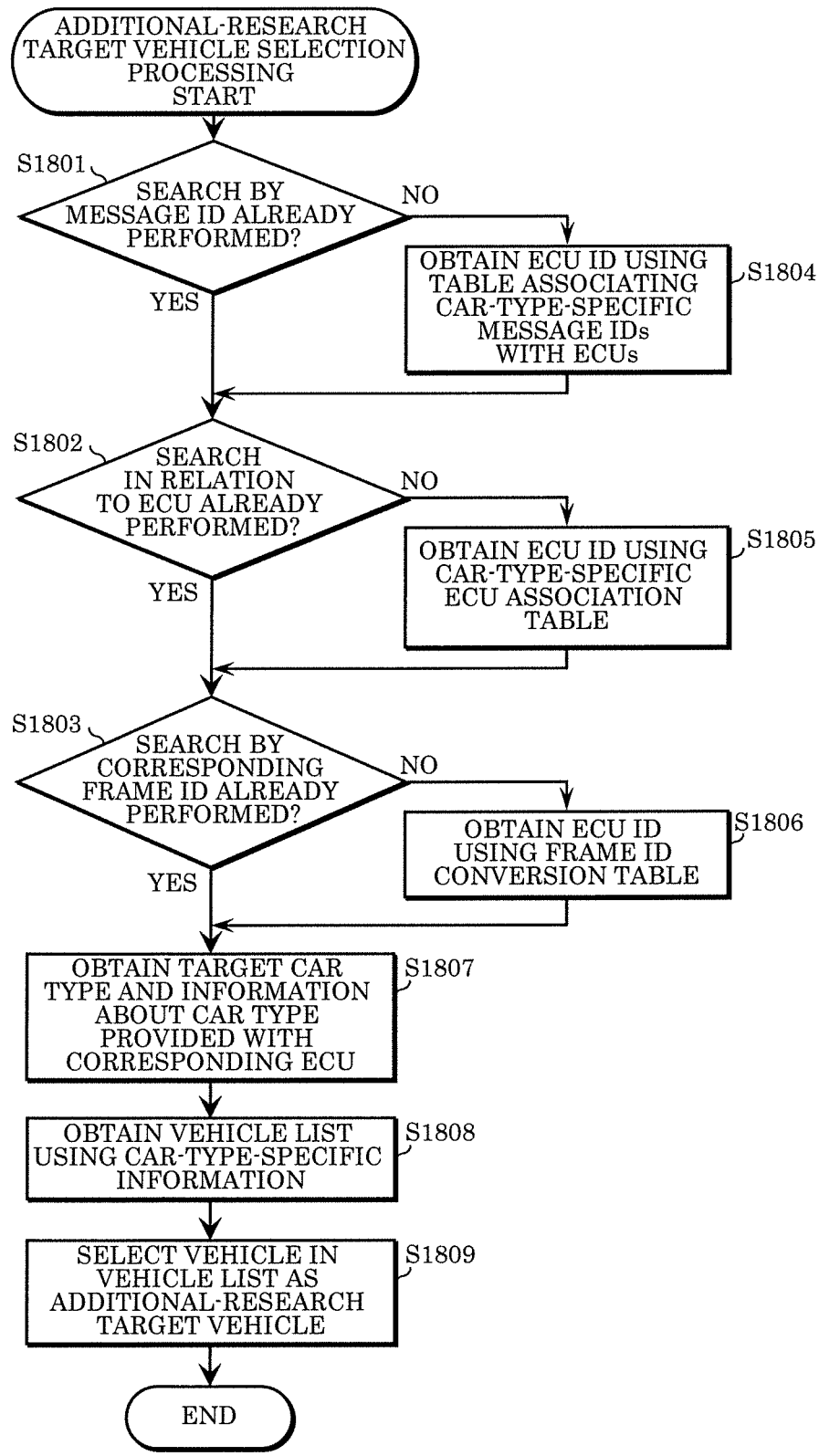
FIG. 18 is a flowchart of an exemplary procedure executed by the vehicle anomaly detection server of the vehicle anomaly detection system to select an additional-research target vehicle.

FIG. 18 is a flowchart of an exemplary procedure for selecting an additional-research target vehicle.

Log-collection target vehicle selector 855 of vehicle anomaly detection server 80 selects the additional-research target vehicle by reference to vehicle information DB 860 and ECU information DB 865. To select the additional-research target vehicle in this example, three information items are used, which are the message ID of the frame detected to have the anomaly, the ECU ID of the ECU transmitting the frame detected to have the anomaly, and the message ID of a frame corresponding to the frame detected to have the anomaly.

As illustrated in the flowchart of FIG. 18, log-collection target vehicle selector 855 determines whether the additional-research target vehicle has been searched for by the message ID (Step S1801). If the search by the message ID has not been performed (NO in Step S1801), log-collection target vehicle selector 855 obtains the ECU ID associated with the message ID of the frame determined as being anomalous, using the table associating car-type-specific message IDs with ECUs (see FIG. 12) (Step S1804).

If the search by the message ID has been performed (YES in Step S1801) or subsequent to Step S1804, log-collection target vehicle selector 855 determines whether the additional-research target vehicle has been searched in relation to the ECU (Step S1802). If the search in relation to the ECU has not been performed (NO in Step S1802), log-collection target vehicle selector 855 obtains the ECU ID associated with the ECU transmitting the frame determined as being anomalous, using the car-type-specific ECU association table (see FIG. 13) and vehicle information table 861 (see FIG. 7) (Step S1804).

If the search in relation to the ECU has been performed (YES in Step S1802) or subsequent to Step S1805, log-collection target vehicle selector 855 determines whether the additional-research target vehicle has been searched for by the corresponding message ID (Step S1803). If the search by the corresponding to message ID has not been performed (NO in Step S1803), log-collection target vehicle selector 855 obtains the ECU ID of the ECU transmitting the frame corresponding to the frame determined as being anomalous, using the corresponding message ID conversion table (see FIG. 11) and vehicle information table 861 (see FIG. 7) (Step S1806).

Next, log-collection target vehicle selector 855 obtains information about a car type provided with the ECU having the obtained ECU ID and information about another car type provided with an ECU corresponding to this ECU, using the ECU ID conversion table (see FIG. 10) (Step S1807).

Next, log-collection target vehicle selector 855 uses the car-type-specific information (see FIG. 8) to obtain a regional vehicle list for each car type indicated by the information obtained in Step S1807 (Step S1808). Then, log-collection target vehicle selector 855 selects the vehicle in this vehicle list as the additional-research target vehicle (Step S1809).

As described above, log-collection target vehicle selector 855 selects the additional-research target vehicle using the information about the frame related to the detected anomaly. Vehicle 1010 selected in this way is likely to have a vulnerability similar to that of the vehicle having the anomaly. More specifically, this vehicle 1010 is likely to have the same anomaly in the in-vehicle network. Thus, selecting such vehicle 1010 as the additional-research target for determining whether an anomaly is present enables early anomaly handling with efficiency. Vehicle 1010 selected by log-collection target vehicle selector 855 using the information about the frame related to the detected anomaly is an example of an anomaly-related vehicle according to the present embodiment.

In the above description, the regional vehicle list for each car type is obtained using the car-type-specific information in Step S1809. However, instead of the lists by regions, a single type-specific vehicle list covering all the regions may be obtained. All the vehicles in the vehicle list may not be the additional-research target vehicles. The target vehicles in the vehicle list may be further narrowed down in accordance with the result of the determination of the anomaly levels, for example. Here, the result of the determination of the anomaly level refers to the result of the determination of the alert level (Step S203). Alternatively, the target vehicles may vary depending on the number of vehicles in the vehicle list, a congestion status of network 81, or the size of the load on the vehicle anomaly detection server 80.

Although the three information items are used in the flowchart of FIG. 18, this is not intended to be limiting. For example, only a part of these three information items may be used, or different information may be additionally used.

2.13 Vehicle Anomaly Monitoring by Vehicle Anomaly Detection Server

The following describes an example of anomaly monitoring performed on the plurality of vehicles by vehicle anomaly detection server 80 in vehicle anomaly detection system according to the present embodiment. FIG. 19 is a sequence diagram illustrating an overview of communications for anomaly monitoring performed by vehicle anomaly detection server 80 on the plurality of vehicles (vehicles 1010a, 1010b, and 1010c) of car type A.

At the temporal beginning in this sequence diagram, the vehicle anomaly detection system is in a normal state. More specifically, assume that no anomaly is detected by vehicle anomaly detection server 80 at the temporal beginning. Vehicle anomaly detection server 80 selects a monitoring target vehicle to detect an anomaly (Step S1901). This target-vehicle selection processing is performed according to the vehicle selection processing illustrated in FIG. 16, for example. In this example, vehicle 1010a is selected and vehicle anomaly detection server 80 transmits the log transmission request to vehicle 1010a (Step S1902). The steps thus far correspond to Steps S114 and S115 of FIG. 15.

Receiving the request, vehicle 1010a performs log transmission determination at timing of log transmission determination and transmits the frame information of the frame transmitted and received over the in-vehicle network of vehicle 1010a, or more specifically, transmits the feature vector as the log in this example, to vehicle anomaly detection server 80 (Step S1950). This step corresponds to Step S116 and Steps S107 to S109 of FIG. 15.

Receiving the log (the feature vector) transmitted from vehicle 1010a in response to the request, vehicle anomaly detection server 80 calculates the anomaly level from the information indicated by the feature vector and the model based on the information received thus far. Then, vehicle anomaly detection server 80 performs the anomaly detection processing to determine whether an anomaly is present on the basis of whether the anomaly level exceeds the predetermined threshold (Step S1903). This step corresponds to Steps S112 and S113 of FIG. 15.

If no anomaly is detected as a result of the anomaly detection processing, Steps S1901, S1902, S1950, and S1903 are repeated until the time when the target vehicle is updated. The description of this example proceeds on the assumption that vehicle 1010a is determined as having no anomaly the whole time during which the aforementioned series of steps are repeated.

At the timing for updating the target vehicle after the lapse of a certain period of time, vehicle anomaly detection server 80 selects a target vehicle again (Step S1911). As a result of the vehicle selection processing in this example, vehicle 1010b is selected as the target vehicle. Vehicle anomaly detection server 80 performs Steps S1911, S1912, and S1913 similar to Steps S1901, S1902, and S1903. Vehicle 1010b performs Step S1960 similar to Step S1950 performed by vehicle 1010a. Receiving the log (the feature vector) transmitted from vehicle 1010b in response to the request, vehicle anomaly detection server 80 performs the anomaly detection processing. The description of this example proceeds on the assumption that vehicle 1010b is determined as having no anomaly the whole time during which the aforementioned series of steps are repeated.

At the timing for updating the target vehicle again after another lapse of the certain period of time, vehicle anomaly detection server 80 selects a target vehicle again (Step S1913). As a result of the vehicle selection processing this time in the example, vehicle 1010c is selected as the target vehicle. Vehicle anomaly detection server 80 performs Steps S1921, S1922, and S1923 similar to Steps S1901, S1902, and S1903. Vehicle 1010c performs Step S1970 similar to Step S1950 performed by vehicle 1010a. In this example, assume that an anomaly is determined as occurring, as a result of the anomaly detection processing performed by vehicle anomaly detection server 80 using the log transmitted from the vehicle 1010c in response to the request. In this case, vehicle anomaly detection server 80 performs the additional-research target vehicle selection processing instead of performing again the series of steps from Step S1921 (Step S1931). The additional-research target vehicle is selected by the steps of the additional-research target vehicle selection processing illustrated in FIG. 18, for example. The description proceeds on the assumption that the vehicles of the same type as the vehicle detected to have the anomaly, or more specifically, vehicle 1010a and vehicle 1010b, are selected.

Next, vehicle anomaly detection server 80 transmits the log transmission request to vehicles 1010a and 1010b (Step S1932). In response to this request, each of vehicles 1010a and 1010b transmits the feature vector as the log to vehicle anomaly detection server 80 (Steps S1955 and S1965).

Receiving the feature vector from each of vehicles 1010a and 1010b, vehicle anomaly detection server 80 performs the anomaly detection processing on each of vehicles 1010a and 1010b (Step S1933).

In the series of steps described above, log-collection target vehicle selector 855 that performs the additional-research target vehicle selection processing in Step S1931 is an example of a vehicle selector according to the present embodiment. Moreover, the selected vehicle is an example of an anomaly-related vehicle according to the present embodiment. The log transmission request transmitted in Step S1932 is an example of a first request.

In the steps up to and including Step S1911, vehicle 1010a selected in Step S1901 is an example of a first sample vehicle and the request transmitted to vehicle 1010a is an example of a second request, according to the present embodiment. Vehicle 1010b selected in Step S1911 is an example of a second sample vehicle and the request transmitted to vehicle 1010b is an example of a third request, according to the present embodiment.

In the procedure illustrated in FIG. 19, vehicle anomaly detection server 80 performs the anomaly detection processing (Step S1933) after receiving the feature vector from each of vehicles 1010a and 1010b. However, the anomaly detection processing (Step S1916) may be performed whenever the feature vector is received from vehicle 1010.

In this example, whether the frame transmitted and received over the in-vehicle network of vehicle 1010 has an anomaly is determined through the log analysis performed by log analyzer 840 of vehicle anomaly detection server 80 (Steps S1903, S1913, and S1923). However, this is not intended to be limiting. For example, fraudulent-frame detector 903 of vehicle 1010 or a different device having a data security function or a self-diagnostic function may determine whether an anomaly is occurring to the vehicle. Then, data indicating the result of this determination may be provided to vehicle anomaly detection server 80. In this case, by obtaining the data indicating this result instead of performing the log analysis, log analyzer 840 obtains information indicating whether the anomaly is occurring to vehicle 1010 that is the transmission source. Then, log analyzer 840 may perform a subsequent step appropriate to the presence or absence of the anomaly. If vehicle 1010 is detected to have an anomaly, this vehicle provides the frame information about the fraudulent frame to vehicle anomaly detection server 80. Using this frame information, vehicle anomaly detection server 80 determines the alert level and selects the additional-research target vehicle, for example.

Although one target vehicle is selected at the normal state in this example, more than one target vehicle may be selected. Although the target vehicle is updated after the lapse of the certain period of time, the updating may be performed at different timing. The additional-research target vehicle may be selected by a different selection method described above. The target vehicles may be selected regardless of their car manufactures or car types. Although omitted from FIG. 19, alert notification may be transmitted when the anomaly is detected.

2.14 Supplementary Notes

The following describes possible variations that are not described above to avoid a complicated description.

As described above, the vehicles of the same car type refer to the vehicles that are of the same model and have the partially-identical vehicle IDs. However, this is not intended to be limiting. For example, vehicles including the ECUs having the same configuration or having the same ECU arrangement on the in-vehicle networks may be treated as belonging to the same car type because these vehicles may have the same vulnerability to cyberattacks. Thus, vehicles that are of the same model but have the ECUs from different suppliers may be treated as belonging to different car types, not the same car type. Conversely, the ECUs that are from different suppliers but have the same control specifications may be treated as having the same configuration. Even when the ECUs are from the same supplier and have the same model number, these ECUs may be treated as belonging to different car types if versions of software (including firmware) included in the ECUs are different.

The timing of re-selecting the target vehicle (Steps S1911 and S1921 in FIG. 19) is not limited to the timing when the certain period of time has elapsed from the previous selection processing. The timing may be changed or the target vehicle re-selection may be performed whenever necessary, in accordance with server setting or an instruction from an original equipment manufacturer (OEM) or a security operation center (SOC).

Unlike the above, vehicle anomaly detection server 80 may not individually select the vehicles that transmit the logs. For example, vehicle anomaly detection server 80 may set conditions, such as a time and a region, and notifies all the vehicles of the conditions. Then, each of the vehicles may determine whether the vehicle is a target vehicle, on the basis of information specific to this vehicle, the time information, and the location information, for example. If determining so, the vehicle may transmit the log to vehicle anomaly detection server 80.

As described above, the anomaly level calculated by vehicle anomaly detection server 80 does not exceed the predetermined threshold in the normal state and thus the processing appropriate to the normal state is performed. However, this is not intended to be limiting. For example, the processing may be switched between the processing for the normal state and the processing for the anomalous state, in accordance with an instruction from the OEM or SOC, or notification from a different system, such as an ITS.

The log transmission request from vehicle anomaly detection server 80 may be different between the normal state (Steps S1902, S1912, and S1922 in FIG. 19) and the time when an anomaly is detected (Step S1932). For example, the log transmission request may include an emergency flag area, and an emergency flag may be set when an anomaly is detected. In response to this, vehicle 1010 may give a higher priority to the log transmission processing. Alternatively, vehicle 1010 may prepare a log different from the log in the normal state, or more specifically, a more detailed or simpler log, and transmit this log to vehicle anomaly detection server 80. For times other than the normal state, the request and the log may vary depending on the attack phase or alert level.

Other Variations

Although the technology according to the present disclosure has been described by way of the embodiment above, it should be obvious that the technology according to the present disclosure is not limited to the embodiment described above. Other embodiments implemented through various changes, substitutions, additions, and omissions may be included in the scope in an aspect or aspects according to the present disclosure. For example, the following variations are also included in an aspect or aspects according to the present disclosure.

(1) In the embodiment above, the vehicle includes the in-vehicle network (the in-vehicle network system) that conducts communications under the CAN protocol, for example. However, the applicable network type (communication protocol) of the technology according to the present embodiment is not limited to this. For example, the in-vehicle network may be a CAN-FD, an Ethernet network, a local interconnect network (LIN), or a network under a protocol like Flexray. Alternatively, the in-vehicle network may be a combination of networks under protocols selected from among the aforementioned protocols including the CAN protocol.

(2) In the above embodiment, frame uploader 950 of gateway 90 included in vehicle 1010 performs the pre-transmission processing including the process of generating the feature vector, for example. This processing may be performed by either a structural component of vehicle 1010 or vehicle anomaly detection server 80. Alternatively, the processing may be shared between the structural component of vehicle 1010 and vehicle anomaly detection server 80. Allocation of the shared processing may be determined as a design matter as appropriate.

(3) In the above embodiment, the log transmitted from gateway 90 of vehicle 1010 to vehicle anomaly detection server 80 includes the frame information independent of the result of the determination whether an anomaly is detected in the vehicle. In contrast, in the case where gateway 90 transmits an error frame to the in-vehicle network in response to detection of a fraudulent frame, information (such as a feature vector) about this fraudulent frame may not be transmitted to vehicle anomaly detection server 80. More specifically, the occurrence of the anomaly in the in-vehicle network may not be notified to vehicle anomaly detection server 80.

(4) In the normal state in the above embodiment, vehicle anomaly detection server 80 selects vehicle 1010 that transmits the log to vehicle anomaly detection server 80, and transmits the transmission request or condition to vehicle 1010. However, each of vehicles 1010 may include a system that determines whether to transmit the log to vehicle anomaly detection server 80. For example, vehicle 1010 may repeatedly determine whether the last digit of the vehicle ID matches the last digit of the current time, in the normal state. Then, the log may be transmitted when these digits match each other. Also in this case, when an anomaly is detected by vehicle anomaly detection server 80, vehicle anomaly detection server 80 transmits the request to each vehicle. The target vehicle selection may be performed by another server different from vehicle anomaly detection server 80.

(5) In the above embodiment, vehicle anomaly detection server 80 performs the statistical anomaly detection processing to calculate the anomaly level of a frame. Then, if determining the frame as having an anomaly on the basis of the anomaly level, vehicle anomaly detection server 80 determines the alert level on the basis of the anomaly level, for example. Here, instead of relying on the statistical anomaly detection processing, vehicle anomaly detection server 80 may additionally have a function of calculating the anomaly level of the frame using, for example, a predetermined algorithm and determining the alert level on the basis of the anomaly level (on the basis of whether the frame has an anomaly). For example, suppose that the frame has a message ID predefined for a firmware-updating frame and that transmission of this frame to the CAN bus is confirmed at a time other than a time appropriate for updating the firmware. In this case, vehicle anomaly detection server 80 may calculate the anomaly level indicating the presence of anomaly, determine the alert level, and transmit alert notification, for example. Alternatively, vehicle anomaly detection server 80 may regard this case as phase 2 in the attack sign category and determine the alert level using the attack phase information (see FIG. 9). To simplify the procedure, a determination method based on the fraudulent-frame detection rule indicated by the black list or the white list may be used. By performing the statistical anomaly detection processing in combination with the fraudulent-frame detection processing based on the fraudulent-frame detection rule or algorithm, vehicle anomaly detection server 80 may calculate the anomaly level. In this case, vehicle anomaly detection server 80 calculates the anomaly level to indicate that this frame detected as the fraudulent frame has an anomaly.

(6) The orders in which the steps of the various procedures (including the procedures illustrated in FIG. 15, FIG. 16, FIG. 17, FIG. 18, and FIG. 19) described in the above embodiment are performed are not limited to the orders described above with reference to the drawings. Without departing from the scope of the present disclosure, the orders of steps may be changed, multiple steps may be performed concurrently, or some steps may be omitted.

(7) The gateway and the other ECUs according to the above embodiment are the devices each including a processor, a digital circuit like a memory, an analog circuit, and a communication circuit. Each of these gateway and ECUs may be an information processing device, and is one example of the information processing device. The information processing device may include a storage device like a hard disk drive and hardware components as input-output devices, such as a display, a keyboard, and a mouse. Vehicle anomaly detection 80 according to the above embodiment is a computer including a processor, a storage device, and a communication interface. Additionally, vehicle anomaly detection server 80 may include hardware components as input-output devices, such as a display, a keyboard, and a mouse. Each of the devices (including the ECUs and vehicle anomaly detection server 80) described in the above embodiment may achieve, instead of performing a software-based function by causing the processor to execute the control program stored in the memory, at least a part of this function using dedicated hardware (such as a digital circuit).

(8) Some or all of the structural components included in each of the devices in the embodiments above may be realized as a single system large scale integration (LSI). The system LSI is a super multifunctional LSI manufactured by integrating a plurality of structural components onto a signal chip. To be more specific, the system LSI is a computer system configured with a microprocessor, a ROM, and a RAM, for example. The ROM stores a computer program. The microprocessor operates according to the computer program stored in the ROM, so that a function of the system LSI is achieved. The structural components in each of the devices in the embodiments above may be implemented by individual chips. Alternatively, some or all of the components may be implemented by a single chip. Although the integrated circuit implementing these structural components is referred to as a system LSI here, the integrated circuit may be referred to as an IC, an LSI, a super LSI, or an ultra LSI depending on the scale of integration. Moreover, the method of implementation of the structural components using an integrated circuit is not limited to application of an LSI. The components may be implemented by a dedicated circuit or a general-purpose processor. It is also possible to use a field programmable gate array (FPGA) that can be programmed after being manufactured, or a reconfigurable processor in which connection and setting of circuit cells in an LSI can be reconfigured. Furthermore, when a circuit integration technology that replaces LSIs comes along owing to advances of the semiconductor technology or to a separate derivative technology, the function blocks should be understandably integrated using that technology. There can be a possibility of adaptation of biotechnology, for example.

(9) Some or all of the structural components included in each of the devices described above may be implemented as an IC card or a standalone module that can be inserted into and removed from the corresponding device. The IC card or the module is a computer system configured with a microprocessor, a ROM, and a RAM, for example. The IC card or the module may include the aforementioned super multifunctional LSI. The microprocessor operates according to the computer program, so that a function of the IC card or the module is achieved. The IC card or the module may be tamper-resistant.

(10) An embodiment implemented through any combination of the structural components and functions in the embodiment and variations described above is also included in the scope of the present disclosure.

The present disclosure is applied to an in-vehicle system in the above embodiment. The application of the present disclosure is not limited to the in-vehicle system. The present disclosure is also useful for achieving remote control in industrial use and factory control use as in a smart factory.

INDUSTRIAL APPLICABILITY

The present disclosure is useful in a vehicle anomaly detection system that performs anomaly detection on a plurality of vehicles.

What is claimed is:

1. A vehicle anomaly detection server, comprising:
a communicator that communicates with a vehicle to receive a log of an in-vehicle network included in the vehicle;
a processor; and
a memory including at least one set of instructions that, when executed by the processor causes the processor to perform operations including:
performing a first determination of determining whether an anomaly is occurring in a frame received on a first in-vehicle network of a first vehicle among a plurality of vehicles, based on information indicated in the log received by the communicator, the first vehicle being the vehicle that communicates with the communicator;
selecting, when it is determined in the performing of the first determination that an anomaly is occurring in the frame received on the first in-vehicle network of the first vehicle, an anomaly-related vehicle from among the plurality of vehicles based on the anomaly occurring in the frame received on the first in-vehicle network of the first vehicle;
transmitting, to the anomaly-related vehicle via the communicator, a first request to transmit a log of an in-vehicle network included in the anomaly-related vehicle; and
performing a second determination of determining whether an anomaly is occurring in a frame received on a second in-vehicle network of the anomaly-related vehicle, based on information indicated by the log transmitted from the anomaly-related vehicle in response to the first request and received by the communicator,
wherein the operations further include:
selecting a first sample vehicle from among the plurality of vehicles, the first sample vehicle being a monitoring target vehicle for detecting a vehicle in which an anomaly is occurring,
transmitting a second request to transmit a log of an in-vehicle network included in the first sample vehicle to the first sample vehicle via the communicator,
in the performing the first determination, whether an anomaly is occurring to the first sample vehicle is determined based on information indicated by the log transmitted from the first sample vehicle in response to the second request and received by the communicator,
selecting, when it is determined that no anomaly is occurring to the first sample vehicle, a second sample vehicle from among the plurality of vehicles, the second sample vehicle being a monitoring target vehicle that is different from the first sample vehicle, and transmitting a third request to transmit a log of an in-vehicle network included in the second sample vehicle to the second sample vehicle via the communicator.

2. The vehicle anomaly detection server according to claim 1,
wherein the log is one of: at least a part of time-series data of information included in a frame transmitted and received over the in-vehicle network; and time-series data of information about the frame.

3. The vehicle anomaly detection server according to claim 2,
wherein in the selecting, a vehicle that is of same car type as the first vehicle having the anomaly is selected as the anomaly-related vehicle.

4. The vehicle anomaly detection server according to claim 1, further comprising:
a storage that holds first vehicle information indicating an association between a type of a frame transmitted and received over the in-vehicle network and an information processing device that transmits the frame,
wherein in the selecting
a vehicle including an information processing device that transmits a frame of same type as a frame related to the anomaly occurring to the first vehicle is specified from among the plurality of vehicles, by reference to the first vehicle information, and
the vehicle specified is selected as the anomaly-related vehicle.

5. The vehicle anomaly detection server according to claim 4,
wherein the storage further holds second vehicle information indicating an association of message IDs between different car types, each of the message IDs indicating a type of a frame transmitted and received over the in-vehicle network, and
in the selecting
a message ID that identifies a frame transmitted and received over an in-vehicle network included in a vehicle of a car type different from a car type of the first vehicle and corresponds to a message ID of the frame related to the anomaly occurring to the first vehicle is specified by reference to the second vehicle information,
a vehicle including an information processing device that transmits a frame of a type indicated by the message ID specified is specified from among the plurality of vehicles by reference to the first vehicle information, and
the vehicle specified is selected as the anomaly-related vehicle.

6. The vehicle anomaly detection server according to claim 1, further comprising:
a storage that holds a vehicle ID list for each car type, the vehicle ID list including a vehicle ID identifying a vehicle as a candidate for a transmission destination of the first request,
wherein in the selecting, the anomaly-related vehicle is selected using the vehicle ID list.

7. The vehicle anomaly detection server according to claim 6,
wherein the vehicle ID list indicates a group of vehicle IDs for each geographical area related to the vehicle that is the candidate for the transmission destination of the first request, and
in the selecting, the anomaly-related vehicle is selected based on the geographical area indicated by the vehicle ID list.

8. The vehicle anomaly detection server according to claim 1, further comprising:
a storage that holds associated information-processing-device information that indicates an association between a plurality of information processing devices connected to the in-vehicle network,
wherein in the selecting
a vehicle including an electronic control unit (ECU) that is associated with another ECU that transmits a frame related to the anomaly occurring to the first vehicle is specified from among the plurality of vehicles, by reference to the associated information-processing-device information, and
the vehicle specified is selected as the anomaly-related vehicle.

9. A vehicle anomaly detection system, comprising:
the vehicle anomaly detection server according to claim 1; and
a plurality of vehicles that each communicate with the vehicle anomaly detection server and transmit the log to the vehicle anomaly detection server in response to a request from the vehicle anomaly detection server.

10. A vehicle anomaly detection method executed by the vehicle anomaly detection system according to claim 9, the method comprising:
communicating with a vehicle to receive a log of an in-vehicle network included in the vehicle;
performing a first determination of determining whether an anomaly is occurring to a first vehicle among a plurality of vehicles, based on information indicated in the log received by the communicator, the first vehicle being the vehicle that communicates with the communicator;
selecting, when it is determined in the performing of the first determination that an anomaly is occurring to the first vehicle by the vehicle anomaly detection system, an anomaly-related vehicle from among the plurality of vehicles based on the anomaly occurring to the first vehicle;
transmitting a first request from the vehicle anomaly detection system to the anomaly-related vehicle to request the anomaly-related vehicle to transmit a log of an in-vehicle network included in the anomaly-related vehicle; and
performing a second determination of determining, by the vehicle anomaly detection system, whether an anomaly is occurring to the anomaly-related vehicle, based on information indicated by the log transmitted from the anomaly-related vehicle in response to the first request.

* * * * *